(12) United States Patent
Kingsford et al.

(10) Patent No.: US 10,949,798 B2
(45) Date of Patent: Mar. 16, 2021

(54) MULTIMODAL LOCALIZATION AND MAPPING FOR A MOBILE AUTOMATION APPARATUS

(71) Applicant: SYMBOL TECHNOLOGIES, LLC, Lincolnshire, IL (US)

(72) Inventors: Thomas D. Kingsford, Toronto (CA); Chengzhi W. Liu, Mississauga (CA); Harsoveet Singh, Mississauga (CA); Timothy D. Barfoot, Toronto (CA)

(73) Assignee: Symbol Technologies, LLC, Holtsville, NY (US)

( * ) Notice: Subject to any disclaimer, the term of this patent is extended or adjusted under 35 U.S.C. 154(b) by 451 days.

(21) Appl. No.: 15/583,759

(22) Filed: May 1, 2017

(65) Prior Publication Data

US 2018/0315007 A1 Nov. 1, 2018

Related U.S. Application Data

(60) Provisional application No. 62/492,670, filed on May 1, 2017.

(51) Int. Cl.
*G06Q 10/08* (2012.01)
*G06T 7/00* (2017.01)
(Continued)

(52) U.S. Cl.
CPC ....... *G06Q 10/087* (2013.01); *G01C 21/3647* (2013.01); *G06K 9/00201* (2013.01);
(Continued)

(58) Field of Classification Search
CPC ...... G06Q 10/087; G06Q 10/08; G06Q 20/12; G06T 7/97; G06T 7/73; G06T 7/74;
(Continued)

(56) References Cited

U.S. PATENT DOCUMENTS 5,209,712 A * 5/1993 Ferri ........................ A61H 1/02
482/131
5,214,615 A 5/1993 Bauer
(Continued)

FOREIGN PATENT DOCUMENTS

CA 2835830 A1 11/2012
CA 3028156 1/2018
(Continued)

OTHER PUBLICATIONS

International Search Report and Written Opinion for International Patent Application No. PCT/US2013/053212 dated Dec. 1, 2014.
(Continued)

*Primary Examiner* — Andrew Joseph Rudy

(57) ABSTRACT

A device and method for multimodal localization and mapping for a mobile automation apparatus is provided. Features are extracted from images acquired by a ceiling-facing image device of the mobile automation apparatus in an environment, and stored in association with estimated positions of the mobile automation apparatus in the environment as determined from one or more sensors, as well as in association with features extracted from depth data acquired from a depth-sensing device, for example as map data. The map data is later used by the mobile automation apparatus to navigate the environment based, at least in part, on further images acquired by the ceiling-facing image device.

19 Claims, 10 Drawing Sheets

(51) Int. Cl.
    *G06T 7/73*             (2017.01)
    *G06K 9/20*             (2006.01)
    *G01C 21/36*           (2006.01)
    *G06K 9/00*             (2006.01)
    *G06K 9/62*             (2006.01)
    *G06T 7/521*            (2017.01)
    *G06T 7/579*            (2017.01)
    *G06K 9/46*             (2006.01)

(52) U.S. Cl.
    CPC ......... *G06K 9/00664* (2013.01); *G06K 9/209* (2013.01); *G06K 9/46* (2013.01); *G06K 9/6211* (2013.01); *G06T 7/521* (2017.01); *G06T 7/579* (2017.01); *G06T 7/73* (2017.01); *G06T 7/74* (2017.01); *G06T 7/97* (2017.01); *G06T 2207/10021* (2013.01); *G06T 2207/10024* (2013.01); *G06T 2207/10028* (2013.01); *G06T 2207/30252* (2013.01)

(58) Field of Classification Search
    CPC ................. G06T 7/579; G06T 7/521; G06T 2207/10021; G06T 2207/10024; G06T 2207/10028; G06T 2207/30252; G06K 9/209; G06K 9/6211; G06K 9/00201; G06K 9/00664; G06K 9/46; G01C 21/3647
    USPC ........................................ 705/28–30; 600/595
    See application file for complete search history.

(56) References Cited

U.S. PATENT DOCUMENTS

| | | | |
|---|---|---|---|
| 5,408,322 A | | 4/1995 | Hsu et al. |
| 5,414,268 A | | 5/1995 | McGee |
| 5,534,762 A | * | 7/1996 | Kim .................. A47L 11/4011 318/568.12 |
| 5,566,280 A | | 10/1996 | Fukui et al. |
| 5,953,055 A | | 9/1999 | Huang et al. |
| 5,988,862 A | | 11/1999 | Kacyra et al. |
| 6,026,376 A | | 2/2000 | Kenney |
| 6,034,379 A | | 3/2000 | Bunte et al. |
| 6,075,905 A | | 6/2000 | Herman et al. |
| 6,115,114 A | | 9/2000 | Berg et al. |
| 6,141,293 A | | 10/2000 | Amorai-Moriya et al. |
| 6,304,855 B1 | | 10/2001 | Burke |
| 6,442,507 B1 | | 8/2002 | Skidmore et al. |
| 6,549,825 B2 | * | 4/2003 | Kurata .............. H01L 21/67288 118/715 |
| 6,580,441 B2 | | 6/2003 | Schileru-Key |
| 6,711,293 B1 | | 3/2004 | Lowe |
| 6,721,769 B1 | | 4/2004 | Rappaport et al. |
| 6,836,567 B1 | | 12/2004 | Silver et al. |
| 6,995,762 B1 | | 2/2006 | Pavlidis et al. |
| 7,090,135 B2 | | 8/2006 | Patel |
| 7,137,207 B2 | | 11/2006 | Armstrong et al. |
| 7,245,558 B2 | | 7/2007 | Willins et al. |
| 7,248,754 B2 | | 7/2007 | Cato |
| 7,277,187 B2 | | 10/2007 | Smith et al. |
| 7,295,119 B2 | * | 11/2007 | Rappaport .............. G06F 30/18 340/572.4 |
| 7,373,722 B2 | | 5/2008 | Cooper et al. |
| 7,474,389 B2 | | 1/2009 | Greenberg et al. |
| 7,487,595 B2 | | 2/2009 | Armstrong et al. |
| 7,493,336 B2 | | 2/2009 | Noonan |
| 7,508,794 B2 | * | 3/2009 | Feather .................. H04L 63/104 370/331 |
| 7,527,205 B2 | | 5/2009 | Zhu et al. |
| 7,605,817 B2 | | 10/2009 | Zhang et al. |
| 7,647,752 B2 | | 1/2010 | Magnell |
| 7,693,757 B2 | * | 4/2010 | Zimmerman ........ G05D 1/0246 705/28 |
| 7,726,575 B2 | | 6/2010 | Wang et al. |
| 7,751,928 B1 | | 7/2010 | Antony et al. |
| 7,783,383 B2 | | 8/2010 | Eliuk et al. |
| 7,839,531 B2 | | 11/2010 | Sugiyama |
| 7,845,560 B2 | | 12/2010 | Emanuel et al. |
| 7,885,865 B2 | | 2/2011 | Benson et al. |
| 7,925,114 B2 | | 4/2011 | Mai et al. |
| 7,957,998 B2 | | 6/2011 | Riley et al. |
| 7,996,179 B2 | * | 8/2011 | Lee ..................... G05D 1/0891 700/245 |
| 8,009,864 B2 | | 8/2011 | Linaker et al. |
| 8,049,621 B1 | | 11/2011 | Egan |
| 8,091,782 B2 | | 1/2012 | Cato et al. |
| 8,094,902 B2 | | 1/2012 | Crandall et al. |
| 8,094,937 B2 | | 1/2012 | Teoh et al. |
| 8,132,728 B2 | | 3/2012 | Dwinell et al. |
| 8,134,717 B2 | | 3/2012 | Pangrazio et al. |
| 8,189,855 B2 | | 5/2012 | Opalach et al. |
| 8,199,977 B2 | | 6/2012 | Krishnaswamy et al. |
| 8,207,964 B1 | | 6/2012 | Meadow et al. |
| 8,233,055 B2 | | 7/2012 | Matsunaga et al. |
| 8,265,895 B2 | | 9/2012 | Willins et al. |
| 8,277,396 B2 | * | 10/2012 | Scott .................. A61B 5/1121 600/595 |
| 8,284,988 B2 | | 10/2012 | Sones et al. |
| 8,423,431 B1 | | 4/2013 | Rouaix et al. |
| 8,429,004 B2 | | 4/2013 | Hamilton et al. |
| 8,463,079 B2 | | 6/2013 | Ackley et al. |
| 8,479,996 B2 | | 7/2013 | Barkan et al. |
| 8,520,067 B2 | | 8/2013 | Ersue |
| 8,542,252 B2 | | 9/2013 | Perez et al. |
| 8,571,314 B2 | | 10/2013 | Tao et al. |
| 8,599,303 B2 | | 12/2013 | Stettner |
| 8,630,924 B2 | | 1/2014 | Groenevelt et al. |
| 8,660,338 B2 | | 2/2014 | Ma et al. |
| 8,743,176 B2 | | 6/2014 | Stettner et al. |
| 8,757,479 B2 | | 6/2014 | Clark et al. |
| 8,812,226 B2 | | 8/2014 | Zeng |
| 8,923,893 B2 | | 12/2014 | Austin et al. |
| 8,939,369 B2 | | 1/2015 | Olmstead et al. |
| 8,954,188 B2 | | 2/2015 | Sullivan et al. |
| 8,958,911 B2 | * | 2/2015 | Wong .................. G05D 1/024 700/258 |
| 8,971,637 B1 | | 3/2015 | Rivard |
| 8,989,342 B2 | | 3/2015 | Liesenfelt et al. |
| 9,007,601 B2 | | 4/2015 | Steffey et al. |
| 9,037,287 B1 | | 5/2015 | Grauberger et al. |
| 9,037,396 B2 | | 5/2015 | Pack et al. |
| 9,064,394 B1 | | 6/2015 | Trundle |
| 9,070,285 B1 | | 6/2015 | Ramu et al. |
| 9,129,277 B2 | | 9/2015 | MacIntosh |
| 9,135,491 B2 | | 9/2015 | Morandi et al. |
| 9,159,047 B2 | | 10/2015 | Winkel |
| 9,171,442 B2 | | 10/2015 | Clements |
| 9,247,211 B2 | | 1/2016 | Zhang et al. |
| 9,329,269 B2 | | 5/2016 | Zeng |
| 9,367,831 B1 | | 6/2016 | Besehanic |
| 9,380,222 B2 | | 6/2016 | Clayton et al. |
| 9,396,554 B2 | | 7/2016 | Williams et al. |
| 9,400,170 B2 | | 7/2016 | Steffey |
| 9,424,482 B2 | | 8/2016 | Patel et al. |
| 9,476,964 B2 | * | 10/2016 | Stroila .............. H04M 1/72572 |
| 9,517,767 B1 | | 12/2016 | Kentley et al. |
| 9,542,746 B2 | | 1/2017 | Wu et al. |
| 9,549,125 B1 | | 1/2017 | Goyal et al. |
| 9,562,971 B2 | | 2/2017 | Shenkar et al. |
| 9,565,400 B1 | | 2/2017 | Curlander et al. |
| 9,589,353 B2 | | 3/2017 | Mueller-Fischer et al. |
| 9,600,731 B2 | | 3/2017 | Yasunaga et al. |
| 9,600,892 B2 | | 3/2017 | Patel et al. |
| 9,612,123 B1 | | 4/2017 | Levinson et al. |
| 9,639,935 B1 | | 5/2017 | Douady-Pleven et al. |
| 9,697,429 B2 | | 7/2017 | Patel et al. |
| 9,766,074 B2 | * | 9/2017 | Roumeliotis .......... G01C 21/16 |
| 9,778,388 B1 | | 10/2017 | Connor |
| 9,791,862 B1 | | 10/2017 | Connor |
| 9,805,240 B1 | | 10/2017 | Zheng et al. |
| 9,811,754 B2 | | 11/2017 | Schwartz |
| 9,827,683 B1 | | 11/2017 | Hance et al. |
| 9,880,009 B2 | * | 1/2018 | Bell .................. G01C 21/206 |

(56) References Cited

U.S. PATENT DOCUMENTS

| | | |
|---|---|---|
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 10,019,803 B2 | 7/2018 | Venable et al. |
| 10,111,646 B2 * | 10/2018 | Nycz .................... A61B 8/0875 |
| 10,121,072 B1 | 11/2018 | Kekatpure |
| 10,127,438 B1 | 11/2018 | Fisher et al. |
| 10,197,400 B2 * | 2/2019 | Jesudason ............... G01C 21/20 |
| 10,210,603 B2 | 2/2019 | Venable et al. |
| 10,229,386 B2 | 3/2019 | Thomas |
| 10,248,653 B2 | 4/2019 | Blassin et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 * | 7/2019 | DeLuca ............... G05D 1/0891 |
| 10,352,689 B2 * | 7/2019 | Brown ................ A47L 11/4011 |
| 10,373,116 B2 | 8/2019 | Medina et al. |
| 10,394,244 B2 | 8/2019 | Song et al. |
| 10,573,134 B1 * | 2/2020 | Zalewski ............... G06Q 20/12 |
| 10,672,080 B1 * | 6/2020 | Maurer .................. G06Q 20/34 |
| 10,705,528 B2 * | 7/2020 | Wierzynski ......... G06K 9/00805 |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0168382 A1 | 7/2007 | Tillberg et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Stettner |
| 2010/0214873 A1 | 8/2010 | Somasundaram et al. |
| 2010/0241289 A1 | 9/2010 | Sandberg |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | Volkmann et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller et al. |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahern et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0025201 A1 | 1/2014 | Ryu et al. |

(56) References Cited

U.S. PATENT DOCUMENTS

| | | |
|---|---|---|
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Showering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0088618 A1 | 3/2015 | Basir et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1* | 6/2016 | Lefevre ............ B60W 30/09 701/301 |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0271795 A1 | 9/2016 | Vicenti |
| 2016/0313133 A1 | 10/2016 | Zang et al. |
| 2016/0328618 A1 | 11/2016 | Patel et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0150129 A1 | 5/2017 | Pangrazio |
| 2017/0178060 A1 | 6/2017 | Schwartz |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0101813 A1 | 4/2018 | Paat et al. |
| 2018/0114183 A1 | 4/2018 | Howell |
| 2018/0143003 A1 | 5/2018 | Clayton et al. |
| 2018/0174325 A1 | 6/2018 | Fu et al. |
| 2018/0204111 A1 | 7/2018 | Zadeh et al. |
| 2018/0251253 A1 | 9/2018 | Taira et al. |
| 2018/0281191 A1 | 10/2018 | Sinyavskiy et al. |
| 2018/0293442 A1 | 10/2018 | Fridental et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0087663 A1 | 3/2019 | Yamazaki et al. |
| 2019/0108606 A1 | 4/2019 | Komiyama |
| 2019/0180150 A1 | 6/2019 | Taylor et al. |
| 2019/0197728 A1 | 6/2019 | Yamao |
| 2019/0236530 A1 | 8/2019 | Cantrell et al. |
| 2019/0304132 A1 | 10/2019 | Yoda et al. |
| 2019/0392212 A1 | 12/2019 | Sawhney et al. |

FOREIGN PATENT DOCUMENTS

| | | |
|---|---|---|
| CN | 104200086 A | 12/2014 |
| CN | 107067382 | 8/2017 |
| EP | 0766098 A1 | 4/1997 |
| EP | 1311993 B1 | 5/2007 |
| EP | 2309378 | 4/2011 |
| EP | 2439487 A1 | 4/2012 |
| EP | 2472475 A1 | 7/2012 |
| EP | 2562688 A2 | 2/2013 |
| EP | 2662831 A2 | 11/2013 |
| EP | 2693362 A1 | 2/2014 |
| GB | 2323238 A | 9/1998 |
| GB | 2330265 A | 4/1999 |
| KR | 101234798 | 1/2009 |
| KR | 1020190031431 | 3/2019 |
| WO | WO 99/23600 | 5/1999 |
| WO | 2003/002935 A1 | 1/2003 |
| WO | 2003025805 A1 | 3/2003 |
| WO | 2006136958 A3 | 12/2006 |
| WO | 2007042251 A2 | 4/2007 |
| WO | 2008/057504 A2 | 5/2008 |
| WO | 2008/154611 A2 | 12/2008 |

(56) References Cited

FOREIGN PATENT DOCUMENTS

| | | |
|---|---|---|
| WO | WO 2012103199 | 8/2012 |
| WO | WO 2012103202 | 8/2012 |
| WO | WO 2012154801 | 11/2012 |
| WO | 2013/165674 A1 | 11/2013 |
| WO | WO 2014066422 | 5/2014 |
| WO | 2014/092552 A2 | 6/2014 |
| WO | 2014181323 A1 | 11/2014 |
| WO | 2015/127503 A1 | 9/2015 |
| WO | 2016/020038 A1 | 2/2016 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
Bohm, "Multi-Image Fusion for Occlusion-Free Facade Texturing", International Archives of the Photogrammetry, Remote Sensing and Spatial Information Sciences, pp. 867-872 (Jan. 2004).
Senthilkumaran, et al., "Edge Detection Techniques for Image Segmentation—A Survey of Soft Computing Approaches", International Journal of Recent Trends in Engineering, vol. 1, No. 2 (May 2009).
Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).
Uchiyama, et al., "Removal of Moving Objects from a Street-View Image by Fusing Multiple Image Sequences", Pattern Recognition, 2010, 20th International Conference on, IEEE, Piscataway, NJ, pp. 3456-3459 (Aug. 23, 2010).
Tseng, et al. "A Cloud Removal Approach for Aerial Image Visualization", International Journal of Innovative Computing, Information & Control, vol. 9 No. 6, pp. 2421-2440 (Jun. 2013).
United Kingdom Intellectual Property Office, Combined Search and Examination Report dated Mar. 11, 2015 for GB Patent Application No. 1417218.3.
United Kingdom Intellectual Property Office, Examination Report dated Jan. 22, 2016 for GB Patent Application No. 1417218.3 (2 pages).
United Kingdom Intellectual Property Office, Combined Search and Examination Report dated Jan. 22, 2016 for GB Patent Application No. 1521272.3 (6 pages).
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 15/211,103 dated Apr. 5, 2017.
Notice of allowance for U.S. Appl. No. 14/518,091 dated Apr. 12, 2017.
U.S. Appl. No. 15/583,680, filed May 1, 2017.
U.S. Appl. No. 15/583,801, filed May 1, 2017.
U.S. Appl. No. 15/583,740, filed May 1, 2017.
U.S. Appl. No. 15/583,717, filed May 1, 2017.
U.S. Appl. No. 15/583,773, filed May 1, 2017.
U.S. Appl. No. 15/583,786, filed May 1, 2017.
International Patent Application Serial No. PCT/CN2017/083143 filed May 5, 2017.
"Fair Billing with Automatic Dimensioning" pp. 1-4, undated, Copyright Mettler-Toledo International Inc.
Schnabel et al. "Efficient RANSAC for Point-Cloud Shape Detection", vol. 0, No. 0, pp. 1-12 (1981).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Buenaposada et al. "Real-time tracking and estimation of plane pose" Proceedings of the ICPR (Aug. 2002) vol. II, IEEE pp. 697-700.
Tahir, Rabbani, et al., "Segmentation of point clouds using smoothness constraint," International Archives of Photogrammetry, Remote Sensing and Spatial Information Sciences 365 (Sep. 2006): 248-253.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Lecking et al: "Localization in a wide range of industrial environments using relative 3D ceiling features", IEEE, pp. 333-337 (Sep. 15, 2008).
Golovinskiy, Aleksey, et al. "Min-cut based segmentation of point clouds." Computer Vision Workshops (ICCV Workshops), 2009 IEEE 12th International Conference on. IEEE, 2009.
Datta, A., et al., "Accurate camera calibration using iterative refinement of control points," in Computer Vision Workshops (ICCV Workshops), 2009.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Olson, Clark F., et al. "Wide-Baseline Stereo Vision for Terrain Mapping" in Machine Vision and Applications, Aug. 2010.
"Plane Detection in Point Cloud Data" dated Jan. 25, 2010 by Michael Ying Yang and Wolfgang Forstner, Technical Report 1, 2010, University of Bonn.
Douillard, Bertrand, et al. "On the segmentation of 3D LIDAR point clouds." Robotics and Automation (ICRA), 2011 IEEE International Conference on. IEEE, 2011.
Puwein, J., et al. "Robust multi-view camera calibration for wide-baseline camera networks," in IEEE Workshop on Applications of Computer Vision (WACV), Jan. 2011.
Lari, Z., et al., "An adaptive approach for segmentation of 3D laser point cloud." International Archives of the Photogrammetry, Remote Sensing and Spatial Information Sciences, vol. XXXVIII-5/W12, 2011, ISPRS Calgary 2011 Workshop, Aug. 29-31, 2011, Calgary, Canada.
Federico Tombari et al. "Multimodal cue integration through Hypotheses Verification for RGB-D object recognition and 6DOF pose estimation", IEEE International Conference on Robotics and Automation, Jan. 2013.
Carreira et al., "Enhanced PCA-based localization using depth maps with missing data," IEEE, pp. 1-8, Apr. 24, 2013.
Dubois, M., et al., "A comparison of geometric and energy-based point cloud semantic segmentation methods," European Conference on Mobile Robots (ECMR), vol., No., pp. 88-93, Sep. 25-27, 2013.
Ziang Xie et al., "Multimodal Blending for High-Accuracy Instance Recognition", 2013 IEEE/RSJ International Conference on Intelligent Robots and Systems, pp. 2214-2221.
"Swift Dimension" Trademark Omniplanar, Copyright 2014.
Rusu, et al. "Spatial change detection on unorganized point cloud data," PCL Library, retrieved from Internet on Aug. 19, 2016 [http://pointclouds.org/documentation/tutorials/octree_change.php].
Rusu, et al., "How to incrementally register pairs of clouds," PCL Library, retrieved from the Internet on Aug. 22, 2016 from <http://pointclouds.org/documentation/tutorials/pairwise_incremental_registration.php>.
International Search Report and Written Opinion for corresponding International Patent Application No. PCT/US2016/064110 dated Mar. 20, 2017.
International Search Report and Written Opinion for International Patent Application No. PCT/US2017/024847 dated Jul. 7, 2017.
Hackel et al., "Contour Detection in unstructured 3D point clouds,"IEEE, 2016 Conference on Computer vision and Pattern recognition (CVPR), Jun. 27-30, 2016, pp. 1-9.

(56) References Cited

OTHER PUBLICATIONS

Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for International Application No. PCT/US2019/025859 dated Jul. 3, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/US2019/050370 dated Nov. 19, 2019.
International Search Report and Written Opinion from International Patent Application No. PCT/US2019/064020 dated Feb. 19, 2020.
International Search Report and Written Opinion for International Patent Application No. PCT/US2013/070996 dated Apr. 2, 2014.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion for International Application No. PCT/US2019/025870 dated Jun. 21, 2019.
Jadhav et al. "Survey on Spatial Domain dynamic template matching technique for scanning linear barcode," International Journal of scieve and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Kim, et al. "Robust approach to reconstructing transparent objects using a time-of-flight depth camera", Optics Express, vol. 25, No. 3; Published Feb. 6, 2017.
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
Ni et al., "Edge Detection and Feature Line Tracing in 3D-Point Clouds by Analyzing Geometric Properties of Neighborhoods," Remote Sensing, V8 I9, pp. 1-20 (2016).

Norriof et al., "Experimental comparison of some classical iterative learning control algorithms", IEEE Transactions on Robotics and Automation, Jun. 2002, pp. 636-641.
Oriolo et al., "An iterative learning controller for nonholonomic mobile Robots", The international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-181.
Park et al., "Autonomous mobile robot navigation using passiv rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=pdf, pp. 1-6.
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated May 13, 2020 for GB Patent Application No. 1917864.9.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bristow et al., "A Survey of Iterative Learning Control", IEEE Control Systems, Jun. 2006, pp. 96-114.
Chen et al. "Improving Octree-Based Occupancy Maps Using Environment Sparsity with Application to Aerial Robot Navigation" Robotics and Automation (ICRA), 2017 IEEE.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing ACM SIGGRAPH Computer Graphics", vol. 18, No. 3, ACM pp. 137-145, 1984.
Deschaud, et al., "A Fast and Accurate Place Detection algoritm for large noisy point clouds using filtered normals and voxel growing," 3DPVT, May 2010, Paris, France. [hal-01097361].

(56) References Cited

OTHER PUBLICATIONS

Glassner, "Space Subdivision for Fast Ray Tracing." IEEE Computer Graphics and Applications, 4.10, pp. 15-24, 1984.

* cited by examiner

| POSITION | CEILING IMAGE | DEPTH DATA | DATA |
|---|---|---|---|
| 1 | | | 0 ROTATIONS |
| 2 | | | 2 ROTATIONS |
| 3 | | | 4 ROTATIONS |
| 4 | | | 6 ROTATIONS |

| POSITION | CEILING FEATURES | DEPTH FEATURES | COORDINATES |
|---|---|---|---|
| 1 | IMAGE FEATURE 1 | DEPTH FEATURE 1 | (0,0) |
| 2 | IMAGE FEATURE 2 | DEPTH FEATURE 2 | (0,2) |
| 3 | IMAGE FEATURE 3 | DEPTH FEATURE 3 | (0,4) |
| 4 | IMAGE FEATURE 4 | DEPTH FEATURE 4 | (0,6) |

FIG. 10

MULTIMODAL LOCALIZATION AND MAPPING FOR A MOBILE AUTOMATION APPARATUS

CROSS-REFERENCE TO RELATED APPLICATIONS

This application is related to U.S. Provisional Application No. 62/492,670 entitled "Product Status Detection System," filed on May 1, 2017, by Perrella et al., which is incorporated herein by reference in its entirety.

BACKGROUND OF THE INVENTION

Mobile automation apparatuses are increasingly being used in retail environments to perform pre-assigned tasks such as out of stock detection, low stock detection, price label verification, plug detection (SKU (stock keeping unit) in the wrong position) and planogram compliance (e.g. determining whether products on a "module" of shelving conform to specified plan). For example, such mobile automation apparatuses are generally equipped with various sensors to perform such tasks, as well as to autonomously navigate paths within the retail environment. Such navigation can include both mapping the environment and performing localization to determine a position of a mobile automations apparatus in the environment. Use of near-ground planar lidar is often used to assist with such navigation, including both mapping and localization, however near-ground planar lidar can occasionally be highly incorrect, for example when the environment changes due to structural changes at the near-ground level (e.g. obstacles and/or object on the ground change position, and/or are added or removed from the environment).

Accordingly, there is a need for a device and method for multimodal localization and mapping for a mobile automation apparatus.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 9 depicts example image data, depth data and proprioceptive data acquired by the mobile automation apparatus at different positions along a path in the environment of FIG. 8 in accordance with some embodiments.

FIG. 10 depicts example map data generated from the data of FIG. 9 in accordance with some embodiments.

Figure 1:
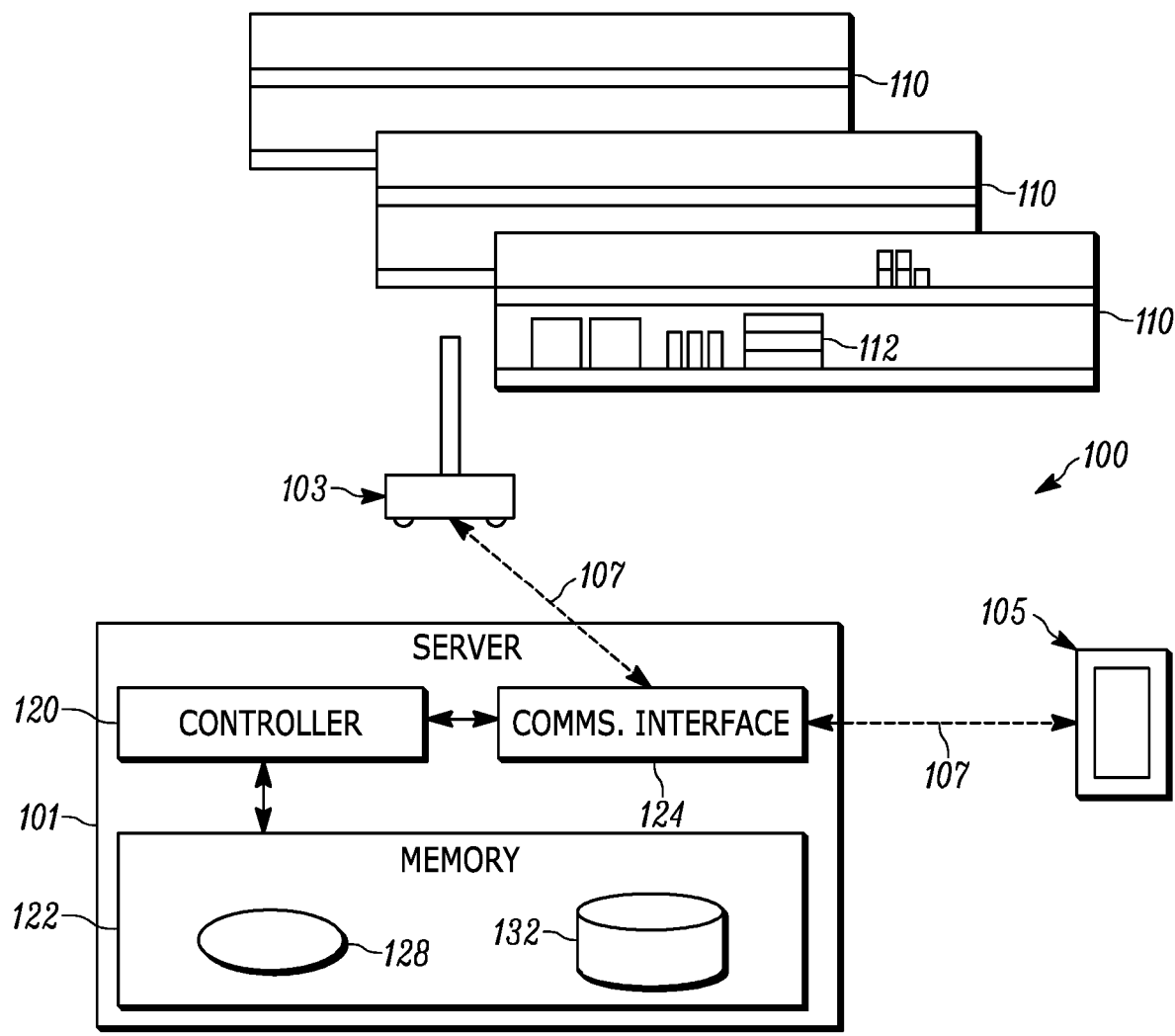
FIG. 1 is a block diagram of a mobile automation system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a mobile automation apparatus for navigating an environment having a ceiling comprising: a movement module for moving the mobile automation apparatus in the environment; an image device configured to acquire images in a ceiling-facing direction from the mobile automation apparatus; a proprioceptive sensor configured to monitor movement of the mobile automation apparatus; and a controller configured to: associate the images received from the image device with proprioceptive data received from the proprioceptive sensor.

In some implementations, the controller is further configured to one or more of: store, to a memory, the images with associated proprioceptive data; and transmit, using a communication interface, the images with associated proprioceptive data to a mapping device.

In some implementations, the image device comprises one or more of a monocular camera, a stereo camera, a color camera, a monochrome camera; a depth camera, a structured light camera, a time-of-flight camera, and a LIDAR device.

In some implementations, the proprioceptive data acquired by the proprioceptive sensor is indicative of a distance traveled by the mobile automation apparatus as the movement module moves the mobile automation apparatus through the environment.

In some implementations, the proprioceptive data is further indicative of changes in direction of the mobile automation apparatus as the movement module moves the mobile automation apparatus through the environment.

In some implementations, the proprioceptive sensor comprises one or more of an odometry device, a wheel odometry device, an accelerometer, a gyroscope and an inertial measurement unit.

In some implementations, the proprioceptive data and the images are one more or more of: time-stamped; acquired periodically; and acquired as a function of time.

The mobile automation apparatus further comprising a depth-sensing device configured to acquire depth data in one or more directions from the mobile automation apparatus, the controller further configured to: associate depth data received from the depth-sensing device with the images and the proprioceptive data. In some of these implementations, the controller is further configured to one or more of: store, to the memory, the images with the associated proprioceptive data and associated depth data; and transmit, using the communication interface, the images with the associated proprioceptive data and the associated depth data. In some of these implementations, the depth-sensing device comprises a LIDAR device.

In some implementations, the controller is further configured to one or more of navigate the environment and determine an adjusted position in the environment by comparing further features extracted from further images acquired by the image device with extracted features from the images, that are associated with positions in the environment.

A further aspect of the specification provides a method comprising: at a mobile automation apparatus comprising: a movement module for moving the mobile automation apparatus in the environment; an image device configured to acquire images in a ceiling-facing direction from the mobile automation apparatus; a proprioceptive sensor configured to monitor movement of the mobile automation apparatus; and a controller, associating, using the controller, the images received from the image device with proprioceptive data received from the proprioceptive sensor. In some implementations, the method further comprises one or more of: storing, to a memory, the images with associated proprioceptive data; and transmitting, using a communication interface, the images with associated proprioceptive data to a mapping device.

Yet a further aspect of the specification provides a non-transitory computer-readable medium storing a computer program, wherein execution of the computer program is for: at a mobile automation apparatus comprising: a movement module for moving the mobile automation apparatus in the environment; an image device configured to acquire images in a ceiling-facing direction from the mobile automation apparatus; a proprioceptive sensor configured to monitor movement of the mobile automation apparatus; and a controller, associating, using the controller, the images received from the image device with proprioceptive data received from the proprioceptive sensor. In some implementations, execution of the computer program is further for one or more of: storing, to a memory, the images with associated proprioceptive data; and transmitting, using a communication interface, the images with associated proprioceptive data to a mapping device Yet a further aspect of the specification provides a device comprising: a communication interface; a memory; and a mapping controller configured to: receive, from one or more of the memory and the communication interface, images with associated proprioceptive data, the images representing a ceiling of an environment acquired by a ceiling-facing imaging device at a mobile automation apparatus and the associated proprioceptive data indicative of movement of the mobile automation apparatus through the environment; extract features from the images; determine, from the associated proprioceptive data, a respective position of a mobile automation apparatus in the environment where each of the images was acquired; and, store, in the memory, extracted features from the images with associated positions.

In some implementations, the mapping controller is further configured to: receive, from one or more of the memory and the communication interface, the images with the associated proprioceptive data and associated depth data indicative of objects located in one or more directions from the mobile automation apparatus; and store, in the memory, the extracted features from the images with the associated positions and further features extracted from the associated depth data. In some of these implementations, the associated positions are stored in association with the extracted features and the further features as map data, and the mapping controller is further configured to refine the map data based on one or more of further images, further depth data, and further proprioceptive data received from the mobile automation apparatus.

Yet a further aspect of the specification provides a method comprising: at a device comprising: a communication interface; a memory; and a mapping controller, receiving, from one or more of the memory and the communication interface, images with associated proprioceptive data, the images representing a ceiling of an environment acquired by a ceiling-facing imaging device at a mobile automation apparatus and the associated proprioceptive data indicative of movement of the mobile automation apparatus through the environment; extract, using the mapping controller, features from the images; determining, using the mapping controller, from the associated proprioceptive data, a respective position of a mobile automation apparatus in the environment where each of the images was acquired; and, storing, using the mapping controller, in the memory, extracted features from the images with associated positions.

In some implementations, the method further comprises: receiving, from one or more of the memory and the communication interface, the images with the associated proprioceptive data and associated depth data indicative of objects located in one or more directions from the mobile automation apparatus; and storing, in the memory, the extracted features from the images with the associated positions and further features extracted from the associated depth data. In some of these implementations, the associated positions are stored in association with the extracted features and the further features as map data, and the method further comprises refining the map data based on one or more of further images, further depth data, and further proprioceptive data received from the mobile automation apparatus.

Yet a further aspect of the specification provides a non-transitory computer-readable medium storing a computer program, wherein execution of the computer program is for: at a device comprising: a communication interface; a memory; and a mapping controller, receiving, from one or more of the memory and the communication interface, images with associated proprioceptive data, the images representing a ceiling of an environment acquired by a ceiling-facing imaging device at a mobile automation apparatus and the associated proprioceptive data indicative of movement of the mobile automation apparatus through the environment; extract, using the mapping controller, features from the images; determining, using the mapping controller, from the associated proprioceptive data, a respective position of a mobile automation apparatus in the environment where each of the images was acquired; and, storing, using the mapping controller, in the memory, extracted features from the images with associated positions.

In some of these implementations, execution of the computer program is further for: receiving, from one or more of the memory and the communication interface, the images with the associated proprioceptive data and associated depth data indicative of objects located in one or more directions from the mobile automation apparatus; and storing, in the memory, the extracted features from the images with the associated positions and further features extracted from the associated depth data. In some of these implementations, the associated positions are stored in association with the extracted features and the further features as map data, and execution of the computer program is further for refining the map data based on one or more of further images, further depth data, and further proprioceptive data received from the mobile automation apparatus.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one mobile device 105 via communication links 107, illustrated in the present example as including wireless links. The system 100 is deployed, in the illustrated example, in a retail environment including a plurality of modules 110 of shelves each supporting a plurality of products 112. More specifically, the apparatus 103 is deployed within the retail environment, and controlled by the server 101 (via the link 107) to travel a path within the retail environment that may include passing the length of at least a portion of the modules 110. The apparatus 103 is equipped with a plurality of data capture sensors, such as image sensors (e.g. one or more digital cameras) and depth sensors (e.g. one or more lidar sensors), and is further configured to employ one or more of the sensors to capture shelf data. In the present example, the apparatus 103 is configured to capture a series of digital images of the modules 110, as well as a series of depth measurements, each describing the distance and direction between the apparatus 103 and a point on a module 110 or a product on the module 110.

The server 101 includes a special purpose controller 120 specifically designed generate map data from data received from the mobile automation apparatus 103. The controller 120 is, interconnected with a non-transitory computer readable storage medium, such as a memory 122. The memory 122 includes any suitable combination of volatile (e.g. Random Access Memory or RAM) and non-volatile memory (e.g. read only memory or ROM, Electrically Erasable Programmable Read Only Memory or EEPROM, flash memory). In general, the controller 120 and the memory 122 each comprise one or more integrated circuits. The controller 120, for example, includes any suitable combination of central processing units (CPUs) and graphics processing units (GPUs) and/or any suitable combination of field-programmable gate arrays (FPGAs) and/or application-specific integrated circuits (ASICs) configured to implement the specific functionality of the server 101. In an embodiment, the controller 120, further includes one or more central processing units (CPUs) and/or graphics processing units (GPUs). In an embodiment, a specially designed integrated circuit, such as a Field Programmable Gate Array (FPGA), is designed to perform specific functionality of the server 101, either alternatively or in addition to the controller 120 and the memory 122.

The server 101 also includes a communications interface 124 interconnected with the controller 120. The communications interface 124 includes any suitable hardware (e.g. transmitters, receivers, network interface controllers and the like) allowing the server 101 to communicate with other computing devices—particularly the apparatus 103 and the mobile device 105—via the links 107. The links 107 may be direct links, or links that traverse one or more networks, including both local and wide-area networks. The specific components of the communications interface 124 are selected based on the type of network or other links that the server 101 is required to communicate over. In the present example, a wireless local-area network is implemented within the retail environment via the deployment of one or more wireless access points. The links 107 therefore include both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the controller 120. The execution of the above-mentioned instructions by the controller 120 configures the server 101 to perform various actions discussed herein. The applications stored in the memory 122 include a control application 128, which may also be implemented as a suite of logically distinct applications. In general, via execution of the control application 128 or subcomponents thereof, the controller 120 is configured to implement various functionality. The controller 120, as configured via the execution of the control application 128, is also referred to herein as the controller 120. As will now be apparent, some or all of the functionality implemented by the controller 120 described below may also be performed by preconfigured hardware elements (e.g. one or more ASICs) rather than by execution of the control application 128 by the controller 120.

In general, the controller 120 is configured to control the apparatus 103 to capture data, and to obtain the captured data via the communications interface 124 and store the captured data in a repository 132 in the memory 122. The server 101 is further configured to perform various post-processing operations on the captured data, and to detect the status of the products 112 on the modules 110. When certain status indicators are detected, the server 101 is also configured to transmit status notifications to the mobile device 105.

For example, in some embodiments, the server 101 is configured via the execution of the control application 128 by the controller 120, to process image and depth data captured by the apparatus 103 to identify portions of the captured data depicting a back of a module 110, and to detect gaps between the products 112 based on those identified portions. Furthermore, the server 101 is configured to provide a map and/or paths and/or path segments and/or navigation data and/or navigation instructions to the apparatus 103 to enable the apparatus 103 to navigate the path which may pass the modules 110 within a retail environment.

Figure 2:
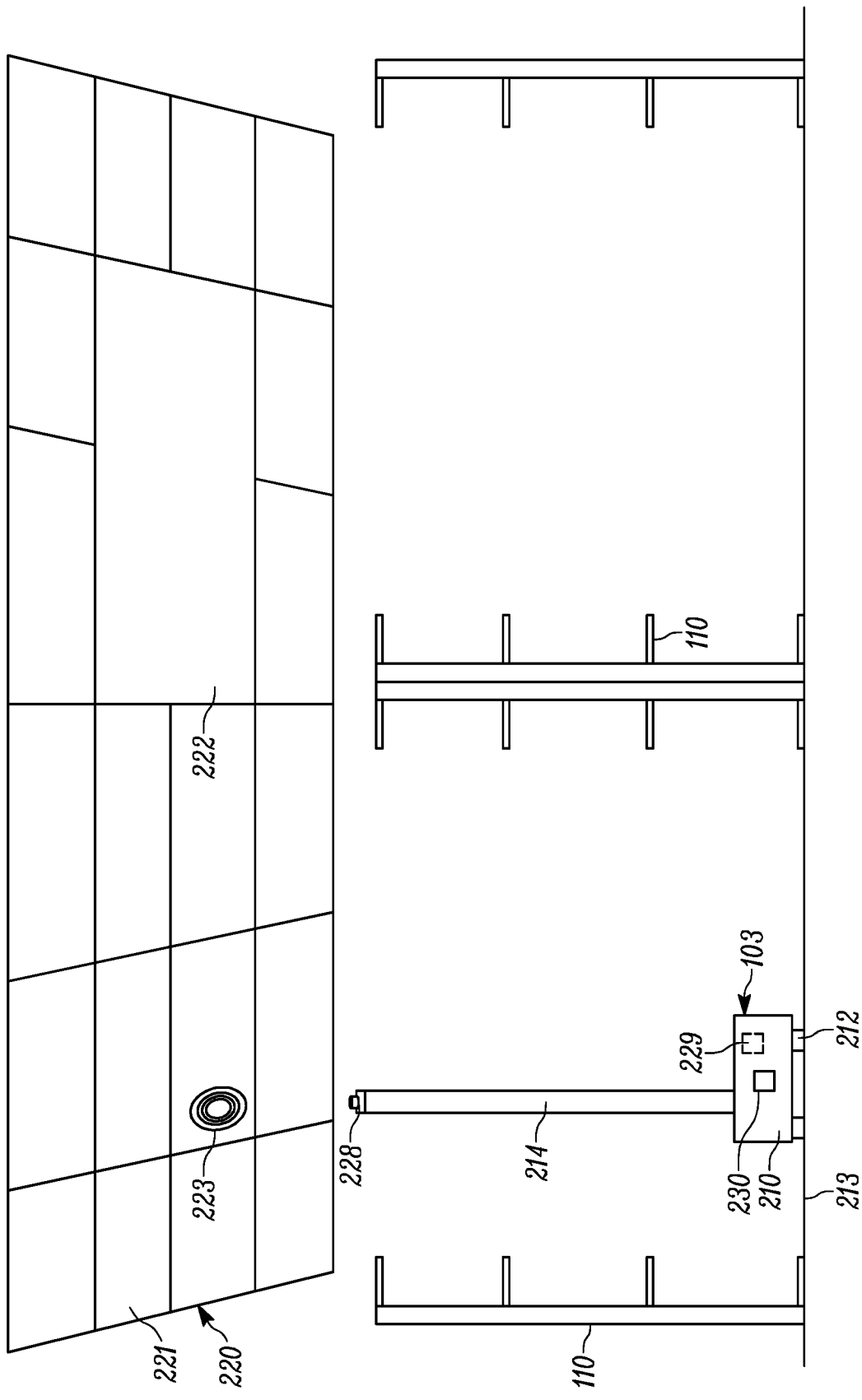
FIG. 2 is a side view of a mobile automation apparatus in accordance with some embodiments.
Figure 3:
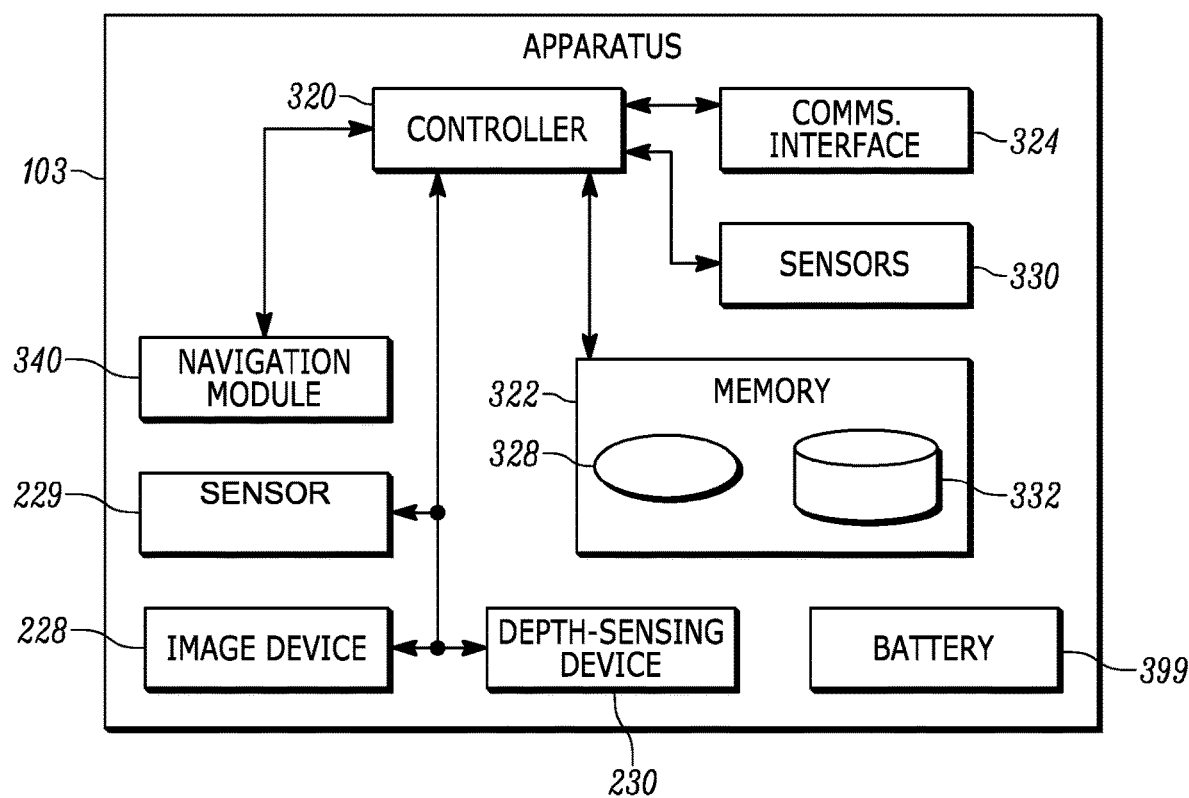
FIG. 3 is a block diagram of the mobile automation apparatus of FIG. 2 in accordance with some embodiments.

Attention is next directed to FIG. 2 and FIG. 3 which respectively depict: a schematic side perspective view of the apparatus 103, showing particular sensors of the apparatus 103; and a schematic block diagram of the apparatus 103.

With reference to FIG. 2, the apparatus 103 is being operated adjacent the modules 110. The apparatus 103 generally comprises a: a base 210 configured to move on wheels 212 (e.g. on a floor 213 of the environment), and the like; and a mast 214 and/or support structure extending in an upward direction (e.g. vertically) from the base 210. However, in other embodiments, the base 210 moves on devices other than wheels, for example casters, tracks and the like. Furthermore, a ceiling 220 of the environment is depicted, the ceiling 220 comprising, for example, ceiling tiles 221, and the like, other than in a region 222, and a fire detector 223. While the ceiling 220 is depicted only with the ceiling tiles 221 and the fire detector 223, the depicted ceiling 220 is an example only, and it is appreciated that the ceiling 220 comprises any item and/or objects that are generally included on ceilings including, but not limited to, lights, other fire detectors, parts of a fire extinguishing system, beams (e.g. structural support beams), skylights, step discontinuities (e.g. due to beams and other structural features) security equipment, network access points, vents, speakers, signage, status indicators, speakers, cameras, beacons, electrical equipment, cabling, labels and the like. In particular, the apparatus 103 is to navigate the environment without reference to external devices and/or external sensors. In this manner, the ceiling 220 of the environment is not changed to accommodate navigation and/or localization of the apparatus 103.

The base 210 and mast 214 and/or support structure may together form a housing; however, in other embodiments, other shapes and/or housings of the apparatus 103 may occur to persons skilled in the art.

The apparatus 103 further includes an image device 228 configured to acquire images in a ceiling-facing direction from the apparatus 103 and/or the mast 214 and/or support structure. For example, as depicted, the image device 228 is mounted in and/or on the mast 214 in an upward-facing and/or ceiling-facing direction. However, the image device 228 need not be on the mast 214; rather the image device 228 is located at the apparatus 103 in a position where the image device 228 is ceiling facing. Hence, the image device 228 is, in some embodiments, mounted in and/or on the base 210.

While the image device 228 is described as comprising a camera, the image device 228 comprises any device which acquires images, including, but not limited to one or more of a monocular camera, a stereo camera, a color camera, a monochrome camera; a depth camera, a structured light camera, a time-of-flight camera, and a lidar device. In some of these embodiments, the images include depth information about the ceiling 220 and/or any object for which images are being acquired.

Regardless, image data from the image device 228 is usable to identify ceiling feature positions in the environment (e.g. using localization references based on the images, such as features extracted from the images), when navigating to a destination physical position.

As depicted, the apparatus 103 further comprises a proprioceptive sensor 229 (interchangeably referred to hereafter as the sensor 229) configured to monitor movement of the apparatus 103 and, in particular, incremental motion. As the sensor 229 is generally internal to the apparatus 103, the sensor 229 is depicted in broken lines in FIG. 2. In particular, proprioceptive data acquired by the proprioceptive sensor 229 is indicative of a distance traveled by the apparatus 103 as a movement module (described with reference to FIG. 3) of the apparatus 103 moves the apparatus 103 through the environment, for example in and around the modules 110. Indeed, the proprioceptive data is further indicative of changes in direction of the apparatus 103 as the movement module moves the apparatus 103 through the environment along a path.

The proprioceptive sensor 229 comprises one or more of an odometry device, a wheel odometry device, an accelerometer, a gyroscope and an inertial measurement unit (IMU), and the like. Indeed, the sensor 229 generally monitors internal signals and/or data of the apparatus 103. For example, when the sensor 229 comprises a wheel odometry device, and the like, the wheel odometry device monitors rotation of the wheels 212 (e.g. using a shaft encoder, and the like) to determine a distance traveled by the apparatus 103, for example since a last measurement of the rotation of the wheels 212 (e.g. as an incremental movement). In these embodiments, the proprioceptive data comprises a count of rotations (and/or portions of rotations) of a shaft of the wheels 212. Such determination of distance and/or incremental movement, occurs, in some embodiments, without reference to a global physical position determining device, such as a GPS (global positioning system device), and the like. Indeed, while in some embodiments the apparatus 103 comprises a GPS device, in an environment in which the apparatus 103 is to navigate, it can be difficult for such a GPS device to acquire a satellite signal. Hence, the sensor 229 is generally configured to determine a distance traveled without reference to any device which globally determines physical position.

Indeed, while the environment could be equipped with devices that assist the apparatus 103 with determining position reading (e.g. devices which assist the apparatus 103 by triangulating a location and/or position, or sensing proximity), in some deployments of the apparatus 103, for example in retail environments, it is a general requirement that the environment not be changed to accommodate the apparatus 103.

Similarly, an IMU, and the like of the sensor 229, and/or proprioceptive data indicative of a steering angle of the wheels 212, enables a determination of a change in direction of the apparatus 103.

Hence, by monitoring the proprioceptive data, a distance traveled and changes in direction are determined. Hence, a local position reading of the apparatus 103 can be generated from the proprioceptive data. In some embodiments, when a common coordinate is provided between a local coordinate system and a global coordinate system, the proprioceptive data is also used to determine a position and/or global coordinate of the apparatus 103 in the global coordinate system.

In yet further implementations, positions of the apparatus 103 are determined with respect to both a physical position of the apparatus 103 in the environment, as well as an orientation of the apparatus 103 at a given physical position, for example an angle of the apparatus 103 with respect to a coordinate system associated with the environment. Such position data that includes orientation can be referred to as pose data and/or as a pose.

As depicted, the apparatus 103 further comprises at least one depth-sensing device 230 configured to acquire depth data in one or more directions from the apparatus 103 and/or the base 210. For example, the at least one depth-sensing device 230 includes, but is not limited to, one or more near-ground planar lidar (Light Detection and Ranging) sensor and/or devices configured to sense depth in one or more directions, for example in one or more movement directions. Indeed, at near-ground level (e.g. between about 5 cm and about 10 cm), the depth-sensing device 230 "observes" shelf structures (e.g. of the modules 110) and/or pallet structures (e.g. pallets stacked on the floor 213) and/or display structure (e.g. displays located on the floor 213 and not on the modules 110). Hence, depth data from the depth-sensing device 230, when present, is usable to identify position in the environment (e.g. using localization references based on the depth data, such as features extracted from the depth data), when navigating to a destination physical position.

Indeed, in some embodiments, the apparatus 103 is non-holonomic and hence configured to move in a constrained number of directions (e.g. a forwards direction, a backwards direction, steering and/or turning left, steering and/or turning right) and the one or more depth-sensing devices 230 is configured to sense depth in one or more of the directions in which the apparatus 103 is configured to move.

While not depicted, the base 210 and the mast 214 are provisioned with other various navigation sensors for navigating in the environment in which the modules 110 are located and/or various obstacle detection sensors for detecting and avoiding obstacles and/or one or more data acquisition sensors for capturing and/or acquiring data associated with products 112, labels and the like on shelves of the modules 110.

Attention is next directed to FIG. 3 which depicts a schematic block diagram of further components of the apparatus 103. In particular, the apparatus 103 includes a special purpose controller 320 specifically designed to associate images from the image device 228, and depth data from the depth-sensing device 230, with positions as described herein. The controller 320 is interconnected with the image device 228, the sensor 229, the depth-sensing device 230, and a non-transitory computer readable storage medium, such as a memory 322. The memory 322 includes any suitable combination of volatile (e.g. Random Access Memory or RAM) and non-volatile memory (e.g. read only memory or ROM, Electrically Erasable Programmable Read Only Memory or EEPROM, flash memory). In general, the controller 320 and the memory 322 each comprise one or more integrated circuits. The controller 320, for example, includes any suitable combination of central processing units (CPUs) and graphics processing units (GPUs) and/or any suitable combination of field-programmable gate arrays (FPGAs) and/or application-specific integrated circuits (ASICs) configured to implement the specific functionality of the apparatus 103. Further, as depicted, the memory 322 includes a repository 332 for storing data, for example data collected by image device 228, the sensor 229, the depth-sensing device 230 and/or other sensors 330. In an embodiment, the controller 320, further includes one or more central processing units (CPUs) and/or graphics processing units (GPUs). In an embodiment, a specially designed integrated circuit, such as a Field Programmable Gate Array (FPGA), is designed to implement obstacle detection as discussed herein, either alternatively or in addition to the controller 320 and memory 322. As those of skill in the art will realize, the mobile automation apparatus 103 can also include one or more special purpose controllers or processors and/or FPGAs, in communication with the controller 320, specifically configured to control navigational and/or data capture aspects of the mobile automation apparatus 103.

The apparatus 103 also includes a communications interface 324 interconnected with the controller 320. The communications interface 324 includes any suitable hardware (e.g. transmitters, receivers, network interface controllers and the like) allowing the apparatus 103 to communicate with other devices—particularly the server 101 and, optionally, the mobile device 105—for example via the links 107, and the like. The specific components of the communications interface 324 are selected based on the type of network or other links over which the apparatus 103 is required to communicate, including, but not limited to, the wireless local-area network of the retail environment of the system 100.

The memory 322 stores a plurality of applications, each including a plurality of computer readable instructions executable by the controller 320. The execution of the above-mentioned instructions by the controller 320 configures the apparatus 103 to perform various actions discussed herein. The applications stored in the memory 322 include a control application 328, which may also be implemented as a suite of logically distinct applications. In general, via execution of the control application 328 or subcomponents thereof, the controller 320 is configured to implement various functionality. The controller 320, as configured via the execution of the control application 328, is also referred to herein as the controller 320. As will now be apparent, some or all of the functionality implemented by the controller 320 described below may also be performed by preconfigured hardware elements (e.g. one or more ASICs) rather than by execution of the control application 328 by the controller 320.

The apparatus 103 further includes sensors 330, including, but not limited to, any further navigation sensors and/or data acquisition sensors and/or obstacle avoidance sensors.

The apparatus 103 further includes a navigation module 340 configured to move the apparatus 103 in an environment, for example the environment of the modules 110. The navigation module 340 comprises any suitable combination of motors, electric motors, stepper motors, and the like configured to drive and/or steer the wheels 212, and the like, of the apparatus 103. In particular, the navigation module 340 is controllable using control inputs, and further error signals associated with the navigation module 340 are determinable (e.g. when slippage of one or more of the wheels 212 occurs, and the like, which is also determinable using the sensor 229).

Hence, in general, the controller 320 is configured to control the apparatus 103 to navigate the environment of the module 110 using data from the navigation sensors to control the navigation module 340 including, but not limited to, avoiding obstacles. For example, while not depicted, the memory 322 further stores a map, and the like, of the environment, which is used for navigation in conjunction with the navigation sensors. The map, and the like, is generally generated from a combination of images from the image device 228, the sensor 229 and, optionally, the depth-sensing device 230 as described hereafter.

In the present example, in particular, the apparatus 103 is configured via the execution of the control application 328 by the controller 320 to: associate images received from the image device 228 with proprioceptive data received from the proprioceptive sensor 229; and one or more of: store, to the memory 322, the images with associated proprioceptive data; and transmit, using the communication interface 324, the images with associated proprioceptive data to a mapping device which includes, but is not limited to, the server 101.

Furthermore, the apparatus 103 is generally powered by a battery 399.

While not depicted, in some embodiments, the apparatus 103 comprises a clock, and the like, including, but not limited to, a clock and/or a timing device, in the controller 320.

Furthermore, as will be described in further detail below, the apparatus 103 is generally configured to operate in at least two modes: a mapping mode in which the apparatus 103 is manually operated, for example using a remote-control device, such as mobile device 105, to manually navigate the apparatus 103 and during which the apparatus 103 acquires data used to generate map data representing a map the environment; and a localization mode in which the apparatus 103 autonomously navigates the environment using the map data acquired in the mapping mode. In some implementations, in the mapping mode, navigation also occurs autonomously according to navigation sensors and/or obstacle avoidance sensors at the apparatus 103; in other words, in these implementations, the apparatus 103 autonomously moves around the environment acquiring the data used to generate the map data.

Figure 4:
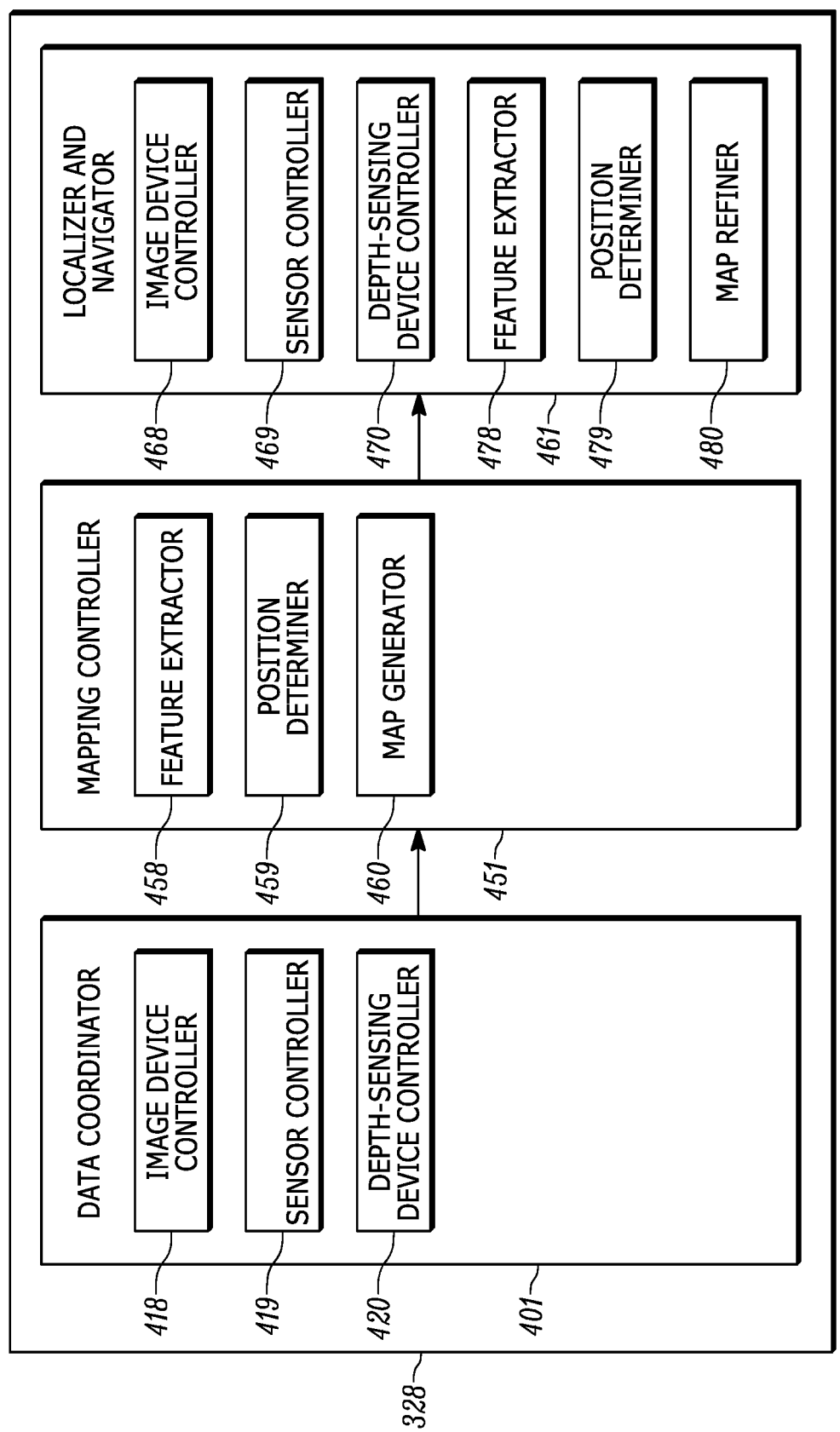
FIG. 4 is a block diagram of a control application in accordance with some embodiments.

Turning now to FIG. 4, before describing the operation of the application 328 (e.g. to associate images received from the image device 228 with proprioceptive data received from the proprioceptive sensor 229), certain components of the application 328 will be described in greater detail. As will be apparent to those skilled in the art, in other examples the components of the application 328 may be separated into distinct applications, or combined into other sets of components. Some or all of the components illustrated in FIG. 4 may also be implemented as dedicated hardware components (e.g. one or more FPGAs and/or one or more ASICs).

The control application 328 includes a data coordinator 401, the data coordinator 401 configured to associate images received from the image device 228 with proprioceptive data received from the proprioceptive sensor 229, for example during the mapping mode. The data coordinator 401 includes: an image device controller 418 configured to control the image device 228 to acquire images; a proprioceptive sensor controller 419 configured to control the sensor 229 to acquire proprioceptive data; and, optionally, a depth-sensing device controller 420 configured to control the depth-sensing device 230 to acquire depth data.

For example, each of the image device controller 418, the proprioceptive sensor controller 419, and the depth-sensing device controller 420 are configured to acquire (respectively) the images, the proprioceptive data and the depth-sending data as one or more of: periodically; and as a function of time. Alternatively, the images, the proprioceptive data and the depth-sending data are time stamped as they are acquired using, for example, using the clock and/or timing device of the controller 320. Alternatively, the images, the proprioceptive data and the depth-sending data are acquired as a function of distance and/or incremental motion, for example for a given rotation of the wheels 212 as determined using the proprioceptive data (e.g. every given number of centimeters, and the like).

Regardless, the data coordinator 401 is configured to associate images received from the image device 228 with proprioceptive data received from the proprioceptive sensor 229 (and optionally depth data from the depth-sensing device 230) based on one or more of respective time stamps, periodicity, and the like. Indeed, in general, images acquired by the image device 228 at a given time are associated with proprioceptive data acquired by the sensor 229 at the give time; and further, when acquired, depth data acquired by the depth-sensing device 230 at the given time are associated with the images and the proprioceptive data acquired at the give time.

In some embodiments, the data coordinator 401 stores the associated images, proprioceptive data and depth data to the memory 322, for example at the repository 332. In other embodiments, the data coordinator 401 transmits, using the interface 324, the associated images, proprioceptive data and depth data to a mapping device, such as the server 101. The mapping device is configured to generate a map and/or map data representing, for example, a path through the environment. In yet further embodiments, the repository 332 comprises a removeable memory (including, but not limited to, a removeable hard-drive, a flash-drive, and the like) which is removed from the apparatus 103 and transported to the mapping device; the mapping device interfaces with the repository 332 to receive the associated images, proprioceptive data and depth data.

Regardless, the apparatus 103 and/or the mapping device receives the associated images, proprioceptive data and depth data and converts the associated images, proprioceptive data and depth data into a map and/or map data, and the like.

For example, when the map/map data generation is performed at the apparatus 103, the application 328 further comprises a mapping controller 451 which performs the conversion. An arrow is depicted from the data coordinator 401 to the mapping controller 451 indicating output and/or data from the data coordinator 401 is received at the mapping controller 451.

In particular, the mapping controller 451 comprises a feature extractor 458 configured to extract features from the images acquired by the image device 228 and, optionally, further configured to extract respective features from the depth data acquired by the depth-sensing device 230. The feature extractor 458 is hence configured to implement one or more feature extraction techniques including, but not limited to Oriented FAST and rotated BRIEF ("ORB"), computer vision feature detection, scale-invariant feature transforms, blob detection, gradient location and orientation histograms, local energy based shape histograms, and the like.

The mapping controller 451 further comprises a position determiner 459 configured to convert the proprioceptive data to a respective position, and the like. For example, when the proprioceptive data comprises wheel odometry data, the wheel odometry data is converted to a position reading such as an estimate of a distance from a starting point and/or an origin to a subsequent physical position. The origin position is generally predetermined and/or manually determined and/or set to a starting position as mapping begins including, but not limited to, a dock position (e.g. a position of a dock with which the apparatus 103 is configured to mate with), a charging station position (e.g. a position of a charging station configured to charge the apparatus 103), and the like; the origin position may also be defined with a given error and/or uncertainty as a unirary constraint on a determination of position of the apparatus 103. For example, each turn and/or partial turn, of a shaft of the wheels 212 is converted to a distance traveled. Similarly, when the proprioceptive data includes accelerometer data, IMU data, and the like, changes in direction of the apparatus 103 are determined, and the position determiner 459 converts the proprioceptive data into a position reading such as two-dimensional (2D) coordinates, based on an origin, for example a starting position as mapping is initiated. However, the origin position can be set to any local position within the environment, and/or according to global coordinate system.

Hence, features extracted by the feature extractor 458 are associated with a ceiling feature position, for example by a map generator 460 configured to generate a map of the environment. The map comprises ceiling feature positions in the environment and features associated with each of the ceiling feature positions, the features including at least ceiling features extracted from the images acquired by the image device 228 at a ceiling feature position, and, optionally, features extracted from the depth data acquired by the depth-sensing device 230 at a depth feature position. The extracted features comprise data that defines intersections, points, angles, depth, three-dimensional features, colors, and the like, in the image data and/or depth data.

Furthermore, the map and/or map data represents paths and/or segments of paths through the environment as generally the ceiling feature positions and associated features, and depth feature positions and associated features are only at physical positions where the apparatus 103 can navigate. Indeed, the map generator 460 is, in some embodiments, configured to further segment a path through the environment into smaller segments, and the apparatus 103 later navigates through the environment on a segment-by-segment basis.

In any event, the mapping controller 451, when present at the apparatus 103, generally stores map data at the memory 322, for example in the repository 332. The map data is then used by the apparatus 103 to navigate through the environment represented by the map data.

Indeed, while not depicted, the data coordinator 401, in some embodiments, further stores control inputs and error signals for the navigation module 340 as a function of time and/or periodically. In these embodiments, the control inputs and error signals for the navigation module 340 are provided to the mapping controller 451 by the data coordinator 401, and the mapping controller 451 stores the control inputs and error signals in the map data according to an associated ceiling feature position or depth data position. For example, the control inputs and error signals are stored on a segment-by-segment basis and/or in association with nodes (e.g. where two adjacent segments meet).

Indeed, the application 328 further comprises a localizer and navigator 461 (referred to interchangeably hereafter as the localizer 461) which performs localization and/or navigation of the apparatus 103 using the map data. An arrow is depicted from the mapping controller 451 to the localizer 461 indicating that map data from the mapping controller 451 is received at the localizer 461.

While not depicted, the localizer 461, in some embodiments, receives a destination position (e.g. in the form of a coordinate), for example a destination in the environment of the modules 110 that is to be navigated to, and which is identifiable using the map data. The localizer 461 then navigates to the destination position using the control inputs and error signals in the map data, for example, as well as using further images, proprioceptive data and, optionally, depth data.

In particular, the localizer 461 comprises an image device controller 468, a proprioceptive sensor controller 469 and, optionally (e.g. when the depth-sensing device 230 is present), a depth-sensing device controller 470 each of which are similar to the image device controller 418, the proprioceptive sensor controller 419 and the depth-sensing device controller 420. Indeed, the localizer 461 generally shares resources with the data coordinator 401 such that the various components of the data coordinator 401 and the localizer 461 are common to both (e.g. the data coordinator 401 and the localizer 461 share a common image device controller 418, 468, etc.). Similarly, the localizer 461 comprises a feature extractor 478 and position determiner 479 similar to the feature extractor 458 and the position determiner 459 and hence a common feature extractor and common position determiner is shared between the mapping controller 451 and the localizer 461.

Hence, at any given position of the apparatus 103, the localizer 461 determines a current position using at least the proprioceptive data acquired by the sensor 229, using the proprioceptive sensor controller 469. The current position is compared with the same position in the map data to determine features stored in association with the same position, presuming there that the apparatus 103 has previously mapped the current position. Such a situation also occurs when the a "loop closure" occurs and the apparatus 103 "loops" back around to a position previously visited.

The localizer 461 compares these features with features extracted from images acquired by the image device 228 at a physical position corresponding to the current position reading, using the image device controller 468, (and optionally compares features extracted from depth data acquired by the depth-sensing device 230 at a physical position corresponding to the current position reading, using the depth-sensing device controller 470).

A determination of position occurs, in some implementations, within respective error boundaries; for example, as the apparatus 103 navigates through the environment, error on the proprioceptive data tends to increase; hence a position estimated may be determined according to the proprioceptive data is determined with an error that may be defined using an ellipse of uncertainty. Similarly, respective position estimates may be determines according to the features extracted from current images data acquired by the image device 228 (e.g. by comparing the extracted features to stored extracted image features in the map data), and according to the features extracted from current depth data acquired by the depth-sensing device 230 (e.g. by comparing the extracted features to stored extracted depth data features in the map data), each with respective ellipses of uncertainty. The intersection of the various ellipses of uncertainty may be used to estimate a current position, also within some error bounds. Furthermore, techniques such as ICP (iterative closest points) may be used in comparing current estimates of position with the map data, which may include using various correction factors, as understood by persons skilled in the art.

In any event, presuming that a current estimated position is within a given error boundary, the localizer 461 generally confirms that the apparatus 103 is navigating successfully and navigation proceeds. Furthermore, in some embodiments, the control input and error signals of the navigation module 340 are updated when the current error signals are smaller than stored error signals and/or error signal thresholds. Such error signals generally comprise data indicative of a navigation error and the like and hence can be alternatively referred to as error data. Regardless, the error signals are storable as data at the memory 322. The error signals include, but are not limited to, one or more of: error signals from navigation sensors, and the like, indicating whether the apparatus 103 is deviating from a path; error signals from proprioceptive sensors that monitor, for example, slippage by the wheels 212; error signals from the navigation module 340 that indicate issues in implementing the control signals; errors signals indicating whether the apparatus 103 is violating any navigation constraints, for example being outside an imaging range, violating an angle constraint and the like. Violating an angle constraint includes determining that the apparatus 103 is at an angle to a module 110 where high-quality images cannot be acquired (e.g. images where labels and the like on the shelves of the modules 110 cannot be imaged adequately for computer vision algorithms to extract data therefrom). Other types of error signals will occur to those skilled in the art.

In some instances, however, a current estimated position is outside a given error boundary. Such an instance may occur, for example, when the apparatus 103 is within a pathological region such as the region 222 (e.g. a pathological region can include regions where mapping and/or localization is difficult due to, for example, a lack of object in the region). In some of these implementations, the apparatus 103 is navigated to another region where localization is more likely to occur, for example outside of the region 222.

In other implementations, however, the apparatus 103 one or more of: stops, and transmits a notification to the server 101 to indicate a position error and/or the like, and/or the apparatus 103 is placed back into the mapping mode, for example to refine the map data. Indeed, in these implementations, the map data may be inaccurate and regions of the environment may be remapped using, for example, a map refiner 480 (and/or the mapping controller 451), which is configured to refine the map data by, for example, replacing data stored therein with current data, acquired as described above. Put another way, the associated ceiling feature positions of the extracted features are refined based on further images and further proprioceptive data received from the mobile automation apparatus 103 (e.g. the further images acquired close to the associated ceiling feature positions already stored in the memory 322, which may be deleted due to inaccuracy). Put yet another way, the apparatus 103 either manually or automatically reenters the mapping mode to remap at least a portion of the environment.

Indeed, such inaccuracy in the mapping data may occur when structural changes have occurred in environment (e.g. new displays, pallets, modules, signs and/or displays on the ceiling etc.), and/or when the map data is inaccurate.

While FIG. 4 was described with respect to a mapping controller 451 being present at the apparatus 103, in some embodiments, the apparatus 103 transmits the associated images, proprioceptive data and depth data to a mapping device such as the server 101 using, for example, link 107a and/or a removable repository 332. In these embodiments, the server 101 generates the map and/or the map data and transmits the map and/or the map data to the apparatus 103.

Figure 5:
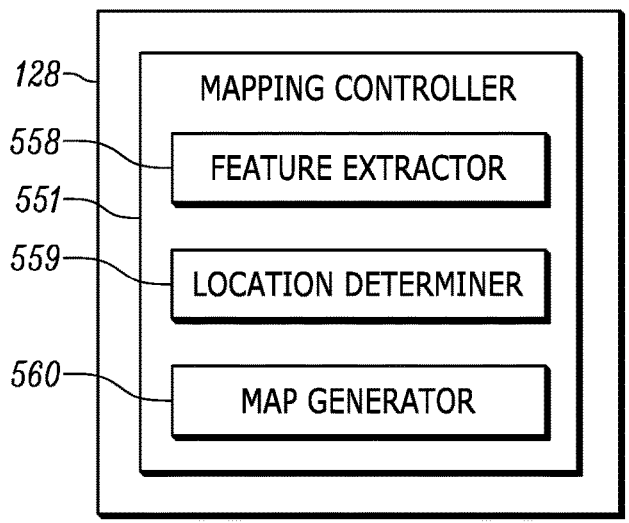
FIG. 5 is a block diagram of a control application in accordance with some embodiments.

Hence, attention is directed to FIG. 5 which depicts a block diagram of an aspect of the control application 128 of the server 101, the application 128 comprising a mapping controller 551 having the same functionality of the mapping controller 451, with similar components including a feature extractor 558, a position determiner 559 and a map generator 560. The mapping controller 551 receives the associated images, proprioceptive data and depth data from the apparatus 103 using links 107 and/or a removable repository 332, and transmits the map data to the apparatus 103 and/or stores the map data in the repository 132 and/or the removable repository 332 (which is returned to the apparatus 103, and otherwise functions similar to the mapping controller 451.

Figure 6:
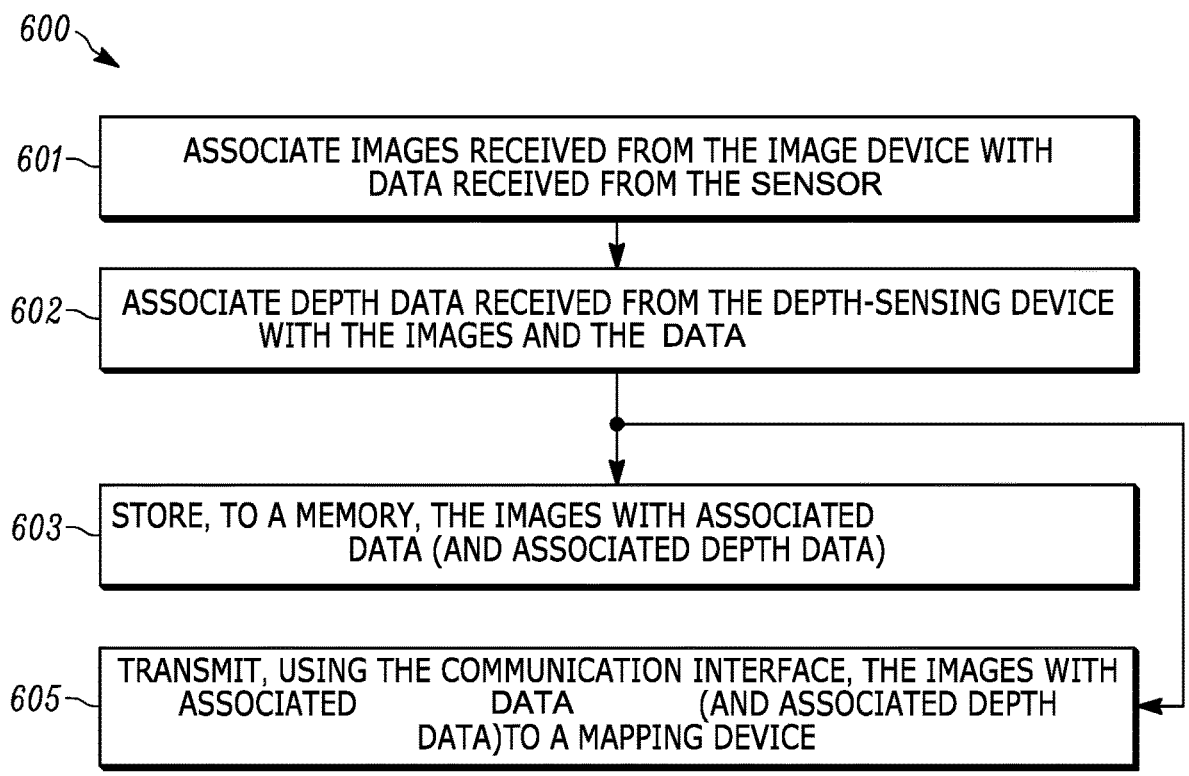
FIG. 6 is a flowchart of a method of mapping an environment using a ceiling-facing image device in accordance with some embodiments.

Attention is now directed to FIG. 6 which depicts a flowchart representative of an example method 600 of mapping an environment using a ceiling-facing image device. The example operations of the method 600 of FIG. 6 correspond to machine readable instructions that are executed by, for example, the apparatus 103, and specifically by the controller 320 and/or the various components of the control application 328 including, but not limited to, the data coordinator 401. Indeed, the example method 600 of FIG. 6 is one way in which the apparatus 103 is configured. However, the following discussion of the example method 600 of FIG. 6 will lead to a further understanding of the apparatus 103, and its various components. However, it is to be understood that in other embodiments, the apparatus 103 and/or the method 600 are varied, and hence need not work exactly as discussed herein in conjunction with each other, and that such variations are within the scope of present embodiments.

Furthermore, the example method 600 of FIG. 6 need not be performed in the exact sequence as shown and likewise, in other embodiments, various blocks may be performed in parallel rather than in sequence. Accordingly, the elements of method 600 are referred to herein as "blocks" rather than "steps." The example method 600 of FIG. 6 may be implemented on variations of the example apparatus 103, as well.

It is further assumed in the method 600, and indeed, throughout the present specification, that the image device 228, the proprioceptive sensors 229, the depth-sensing device 230 are calibrated.

At block 601, the controller 320 associates images received from the image device 228 with proprioceptive data received from the proprioceptive sensor 229.

At block 602, assuming the apparatus 103 further comprises the depth-sensing device 230, the controller 320 associates depth data received from the depth-sensing device 230 with the images and the proprioceptive data.

At block 603, the controller 320 stores, to the memory 322, the images with associated proprioceptive data (and associated depth data, when present).

At the block 605, the controller 320 transmits, using the communication interface 324, the images with associated proprioceptive data (and associated depth data, when present) to a mapping device, for example the server 101.

One of the blocks 603, 605 is optional in some embodiments, depending on whether the apparatus 103 and/or the server 101 is configured as a mapping device and is hence implementing a respective mapping controller 451, 551.

Figure 7:
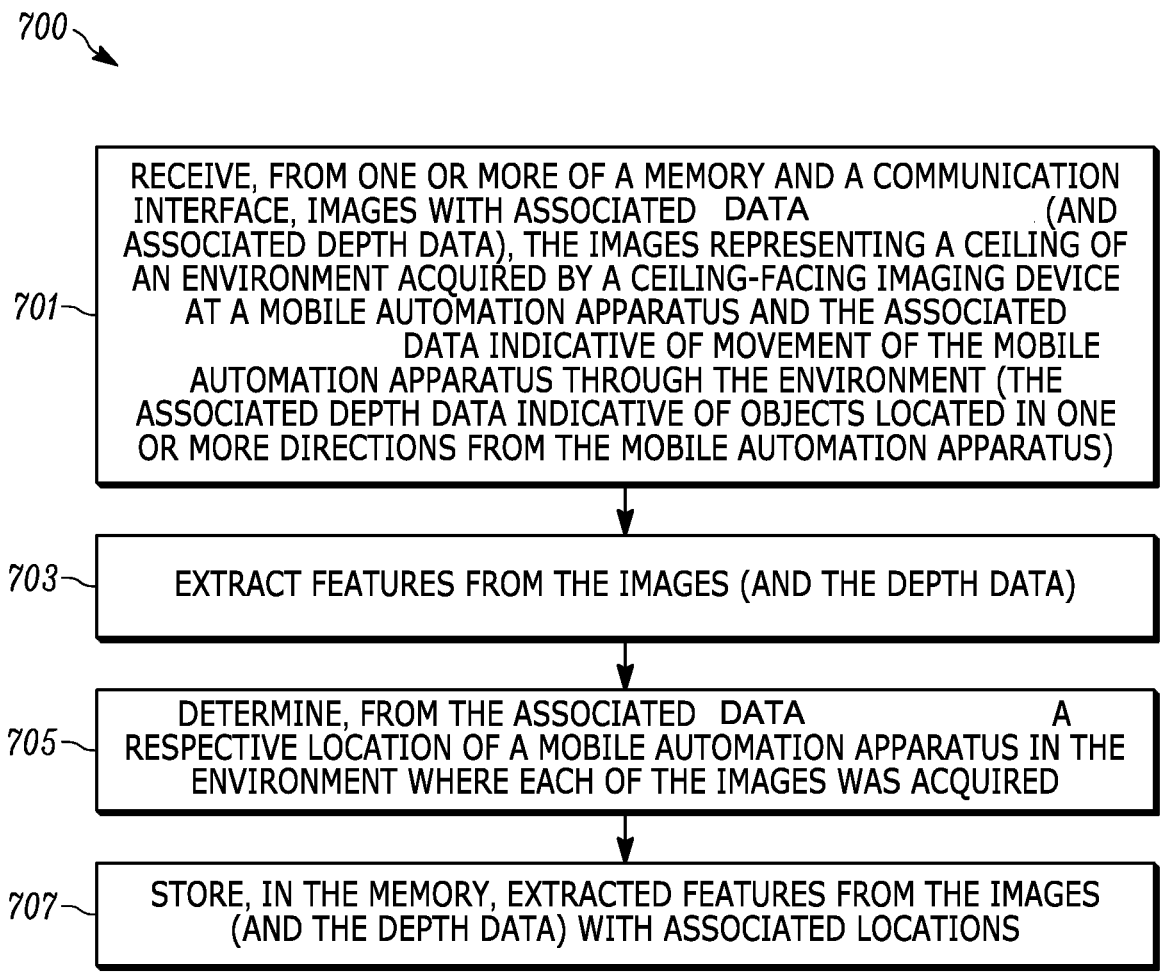
FIG. 7 is a flowchart of a method of generating a map of an environment using images of a ceiling of an environment with some embodiments.

While not depicted, in some embodiments, the method 600 further includes the controller Attention is now directed to FIG. 7 which depicts a flowchart representative of an example method 700 of generating a map and/or map data of an environment using images of a ceiling of an environment. The example operations of the method 700 of FIG. 7 correspond to machine readable instructions that are executed by, for example, the apparatus 103, and specifically by the controller 320 and/or the various components of the control application 328 including, but not limited to, the mapping controller 451.

However, in other embodiments, the example operations of the method 700 of FIG. 7 also correspond to machine readable instructions that are executed by, for example, the server 101, and specifically by the controller 120 and/or the various components of the control application 128 including, but not limited to, the mapping controller 551.

Indeed, the example method 700 of FIG. 7 is one way in which the apparatus 103 and/or the server 101 is configured. However, the following discussion of the example method 700 of FIG. 7 will lead to a further understanding of the apparatus 103, the server 101 and their various components. However, it is to be understood that in other embodiments, the apparatus 103 and/or the server 101 and/or the method 700 are varied, and hence need not work exactly as discussed herein in conjunction with each other, and that such variations are within the scope of present embodiments.

Furthermore, the example method 700 of FIG. 7 need not be performed in the exact sequence as shown and likewise, in other embodiments, various blocks may be performed in parallel rather than in sequence. Accordingly, the elements of method 700 are referred to herein as "blocks" rather than "steps." The example method 700 of FIG. 7 may be implemented on variations of the example apparatus 103 and/or the example server 101, as well.

At block 701, a mapping controller receives, from one or more of a memory and a communication interface, images with associated proprioceptive data, the images representing a ceiling of an environment acquired by a ceiling-facing imaging device at a mobile automation apparatus and the associated proprioceptive data indicative of movement of the mobile automation apparatus through the environment; the mapping controller optionally further receives depth data indicative of objects located in one or more directions from the mobile automation apparatus 103.

At block 703, the mapping controller extracts features from the images (e.g. using the feature extractor 458, 558), as well as the depth data, when received.

At block 705, the mapping controller determines, from the associated proprioceptive data, a respective ceiling feature position of the mobile automation apparatus 103 in the environment where each of the images was acquired (e.g. using the position determiner 459, 559).

At block 707, the mapping controller stores, in a memory (e.g. the memory 122, 322), extracted features from the images with associated ceiling feature positions (e.g. using the map generator 460, 560) as well as further features extracted from the depth data, when received.

The methods 600, 700 are next described with reference to FIG. 8, FIG. 9 and FIG. 10.

Figure 8:
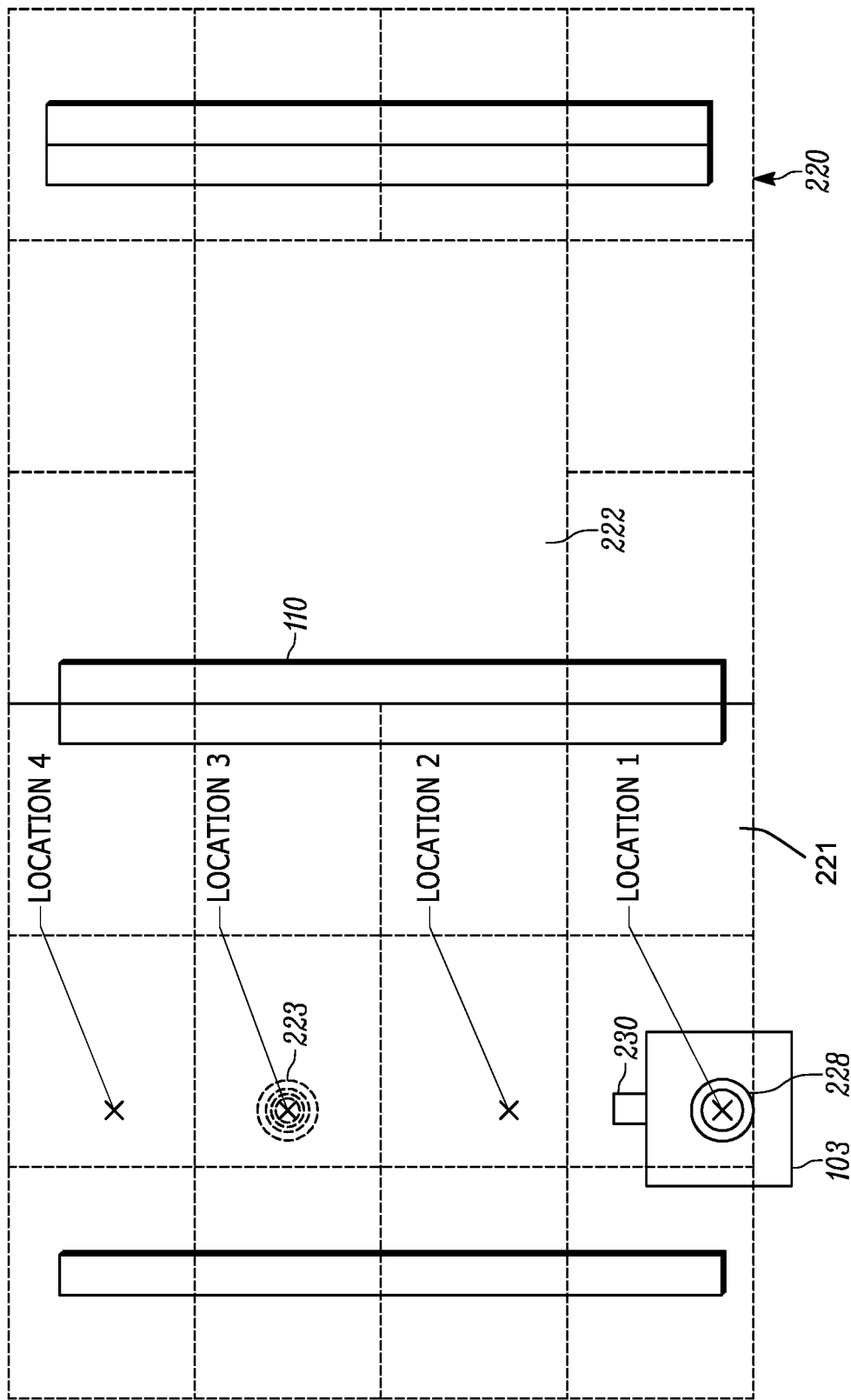
FIG. 8 is a top view of the mobile automation apparatus of FIG. 2 in an environment in accordance with some embodiments.

In particular, FIG. 8 depicts a top view of the apparatus 103 in the environment of the modules 110, for example in a mapping mode, with the relative physical positions of the ceiling tiles 221 and the fire detector 223 of the ceiling 220 depicted in broken lines. Further depicted are four positions, in the form of coordinates: Position 1, Position 2, Position 3, and Position 4 between two of the modules 110. The apparatus 103 is navigated between two of the modules 110 to each of the Positions 1, 2, 3, 4 in a mapping mode (e.g. using a remote-control device, such as mobile device 105) to manually navigate the apparatus 103). Alternatively, a first time the apparatus 103 automatically navigates between Position 1, Position 2, Position 3, and Position 4, the apparatus 103 navigates using obstacle avoidance sensors and/or by maintaining a given distance from one or more of the modules 110.

Regardless of the mode of initial navigation in the mapping mode, at each of the Positions 1, 2, 3, 4, the apparatus 103 acquires an image of the ceiling 220 using the image device 228, and a depth data using the depth-sensing device 230, as well as proprioceptive data from the sensor 229. It is assumed that the apparatus 103 is travelling in a direction in which the depth-sensing device 230 is able to acquire depth data usable to define a position in the environment, including, but not limited to a movement direction, a forward direction, a backwards direction, and the like.

While only four coordinates are discussed in this example, the number of coordinates at which images and data are acquired is configurable, and is periodic, a function of time, and the like; indeed, in some embodiments, an image (and depth data) is acquired at given distances of travel determined from the proprioceptive data, for example, wheel odometry data and the like.

Attention is next directed to FIG. 9 which depicts example associated data 900 acquired by the apparatus 103 at each of the Positions 1, 2, 3, 4 for example using the method 600. In particular, at each of the Positions 1, 2, 3, 4 an image of the ceiling 220 is acquired, for example of joins in the ceiling tiles 221 and/or other objects, such as the fire detector 223 (e.g. at the Position 3). Furthermore, the associated data 900 includes depth data representing a horizontal near-ground scan by the depth-sensing device 230 (e.g. indicating depth of the modules 110 in a planar horizontal scan). Furthermore, the associated data 900 includes proprioceptive data comprising a number of rotations of the wheels 212 from the initial Position 1 (e.g. at the Position 1, the wheels 212 have not turned, so the number of rotations is "0"). However, the proprioceptive data comprises any proprioceptive data indicative of movement. For example, rather than a total number of rotations, the proprioceptive data comprises a number of rotations from a last position reading. While not depicted, turns and/or steering and/or changes in directions are also stored in the proprioceptive data, for example if the apparatus 103 is navigated around a module 110 to a next row of modules 110.

Furthermore, the example data 900 is associated using a time-based technique as described elsewhere in the present specification.

While not depicted, in some embodiments the example data 900 includes control input and error signals (e.g. error data) associated with the navigation module 340 at each Position 1, 2, 3, 4. Indeed, in some embodiments, each Position 1, 2, 3, 4 comprises a node between segments of a path that the apparatus 103 is to navigate.

Attention is next directed to FIG. 10 which depicts example map data 1000 generated from the example associated data 900 using the method 700. It is assumed that the example map data 1000 has been received at the server 101 and/or retrieved from the memory 322 as described elsewhere in the present specification.

For each of the Positions 1, 2, 3, 4 where images, depth data and proprioceptive data has been acquired, features are extracted from the images using, for example, one or more of the feature extractors 458, 558. The features are indicated in FIG. 10 as an "IMAGE FEATURE" or a "DEPTH FEATURE", however the features are stored as any feature data that results from the feature extraction technique (e.g. ORB) used to extract features from images and/or depth data. For example, each of the image feature data and the depth feature data comprise data that defines intersections, points, angles, depth, three-dimensional features, colors, and the like, in the image data and/or depth data.

For each of the Positions 1, 2, 3, 4 where images, depth data and proprioceptive data has been acquired, the proprioceptive data is converted to position reading data, for example as a 2D coordinate. For example, if Position 1 represents one or more of a global origin in the environment and a local origin between the modules 110 where the apparatus 103 is navigating, at "0" rotations, the 2D coordinates for the position is (0,0), as indicated in "X,Y" coordinates. Furthermore, if each rotation of the wheels 212 represents a 1 m distance, at each of the coordinates, the "Y" coordinate increases by 2 between the Positions 2, 3, 4; the "X" coordinate remains at "0" as no movement has yet occurred in the "X" direction.

Indeed, assuming that one of the coordinates generated is associated with a global coordinate system, correspondences between the global coordinate system and the local coordinate system are determined, in some embodiments.

In any event, the coordinates (0,0), (0,2), (0,4), (0,6) represent a path between two of the modules 110. Furthermore, in some embodiments, a distance between the modules 110 is determined from the depth data and/or the depth features and stored in the example map data 1000. In some of these embodiments, an alternate parallel path between the two modules can be determined; for example, assuming that the depth data indicates that the apparatus 103 could also navigate a path a half meter to the right of the path (0,0), (0,2), (0,4), (0,6), the example map data 1000 can also store a path (0.5,0), (0.5,2), (0.5,4), (0.5,6) between the two modules 110. While images and/or depth data (and/or control inputs and/or error signals) associated with the (0.5,0), (0.5,2), (0.5,4), (0.5,6) are not yet stored in the example map data 1000, they can be stored at a later time, for example the first time the apparatus 103 navigates the path (0.5,0), (0.5,2), (0.5,4), (0.5,6). Such navigation occurs, in some embodiments, when the apparatus 103 is avoiding an obstacle along the path (0,0), (0,2), (0,4), (0,6).

Figure 11:
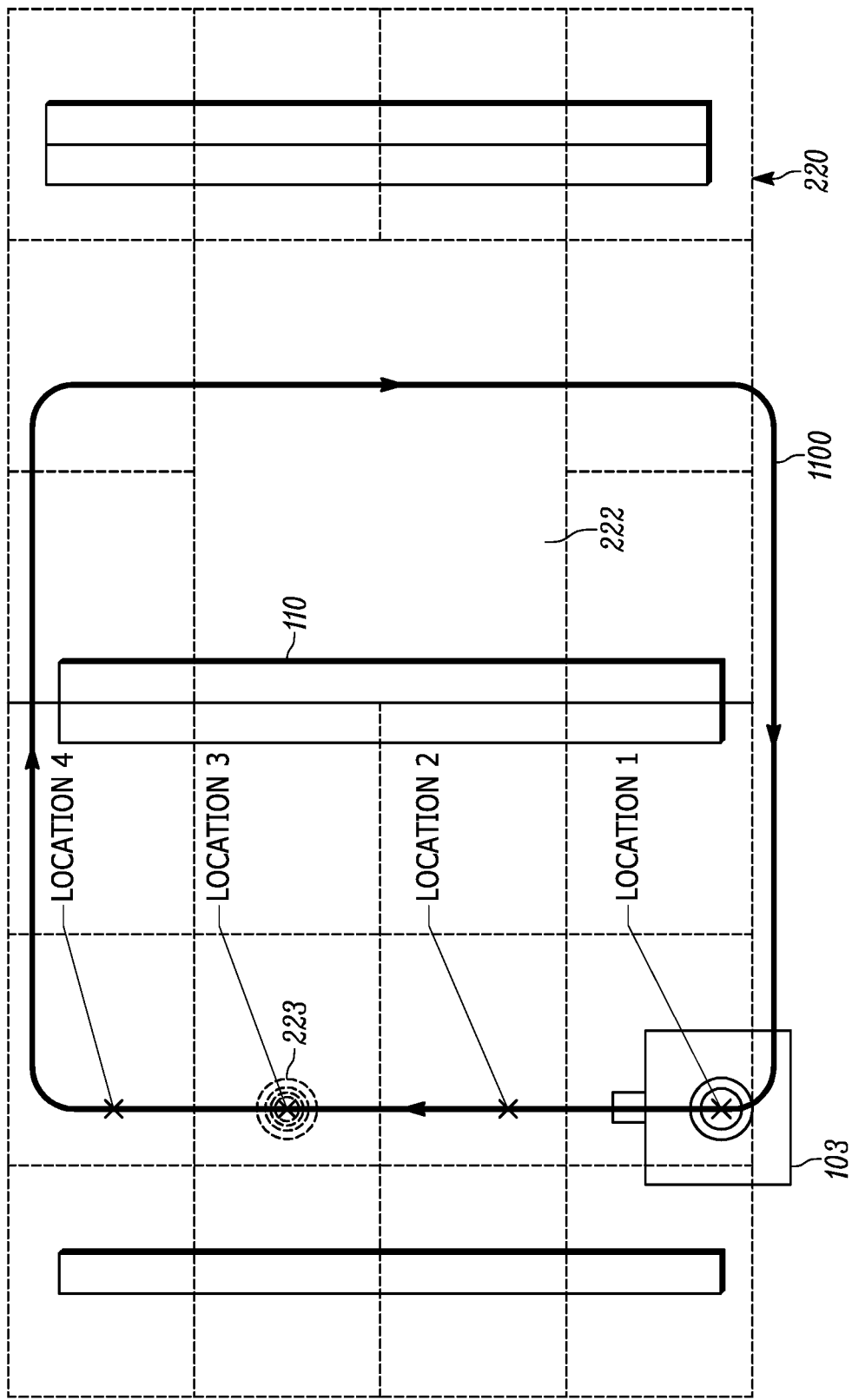
FIG. 11 depicts a closed loop path of the mobile automation apparatus in accordance with some embodiments.

Attention is next directed to FIG. 11 which is similar to FIG. 8, with like elements having like numbers, however FIG. 11 depicts a path 1100 of the apparatus 103 around the modules 110, the path 1100 including the Positions 1, 2, 3 4, of FIG. 8, and further the path 1100 loops back around on itself, which is referred to as a loop closure. Indeed, in the example depicted in FIG. 11, it is assumed that the apparatus 103 has entered a localization mode and is determining an estimate of its current position using, for example, the localizer 461. As depicted, the apparatus 103 is again positioned at the coordinates of Position 1, and further acquires a further image and further depth data respectively from the image device 228 and the depth-sensing device 230. It is further assumed that as the apparatus 103 travels the path 1100, images, depth data and proprioceptive data are acquired as described above.

Furthermore, once the apparatus 103 loops back around to a previously visited position, and/or when a position is determined and/or when the apparatus 103 is in the localization mode, the position is publishable (e.g. by transmitting the position to the server 101) as a local coordinate and/or as global coordinate. In some embodiments, when the apparatus 103 is within a (configurable) threshold distance of a destination position, the apparatus 103 begins to publish the position in at least the local coordinate system which can be more accurate than a global position as the determination of the position is based on the incremental motion determined from the proprioceptive data. In other words, the position in the local coordinate system represent, in some embodiments, a distance from an origin position that is relative to one or more of the modules 110 and/or relative to the environment.

Furthermore, as the loop back around to the region of Position 1, occurs, as determined at least in part from the further images acquired by the image device 228, the control inputs, and further error signals associated with the navigation module 340 are optimized to align the apparatus 103 with the path 1100 to produce a "best" trajectory" back to POSITION 1.

In some embodiments, the proprioceptive data from the sensor 229 indicates that the apparatus 103 is located at Position 1, however it is assumed that an estimated position is determined with an error boundary as described above; in this situation, further extracted features from the further image and the further depth data are compared to the example map data 1000 to further determined the estimated position as described above, for example, by comparing the further extracted features from the further image and the further depth data with the features stored in the map data 1000, including, but not limited to, "IMAGE FEATURE 1" and "DEPTH FEATURE 1" and/or any other image features and/or depth features using ICP techniques, and the like, as described above.

However, in some instances, the error boundary on an estimated position is greater than a threshold error boundary and/or a position of the apparatus 103 may not be determinable. For example, the map data 1000 may be inaccurate and/or the environment may have changed. In general, the likelihood of the ceiling changing is smaller than the likelihood of the environment around the modules 110 changing as the environment around the modules 110 is generally dynamic. In for example, in a simple example, when the further extracted image features match "IMAGE FEATURE 1", but the further extracted depth features do not match "DEPTH FEATURE 1", the apparatus 103 determines that apparatus 103 is located at POSITION 1, and the apparatus 103 may, in some implementations, update the depth features at Position 1 (and/or a current position) with current depth data acquired at Position 1 (and/or the current position). In this manner, the apparatus 103 may perform remapping of the environment while navigating according to the ceiling features.

However, when the error boundary exceeds a threshold error boundary, the apparatus 103, in some implementations, reenters the mapping mode and remaps at least a portion of the environment, as described above.

For example, with further reference to FIG. 11, the path 1100 further includes the region 222 of the ceiling 220 where there are no ceiling tiles 221, or any objects, and the like. Indeed, feature extraction from images of the region 222 generally result in a null result (and/or a small number of features) as there are no features in the region 222. Such areas of the ceiling 220 may be referred to as a pathological region of the image device 228. Indeed, the environment of the modules 110, in some embodiments, includes pathological regions for the depth-sensing device 230. Hence, in some embodiments, the map data includes a sensor weighting for each mapped ceiling feature position indicative of usability, and the like, of respective data at the ceiling feature position for navigation. For example, for ceiling feature positions in the region 222, the weighting on one or more of the images acquired by the image device 228 and extracted features from the images is low as compared to a weighting on one or more of the depth data acquired by the depth-sensing device 230 and extracted features from the depth data. Furthermore, the weightings, when present, are smoothly changed from outside the region 222 to inside the region 222. Hence, when the apparatus 103 is navigating through and/or close to the region 222, the weightings stored in the map data indicate whether the extracted image features or the extracted depth features are to be used to confirm position readings, and/or a weighted combination of both. Such weightings are used by the localizer 461, for example, when determining a weight to place on position estimates, and associated error boundaries, associated with each of the image device 228 and the depth-sensing device 230.

Furthermore, in highly pathological regions, for example, in regions where the features from the images and the depth data are null, and/or include small numbers of features, the apparatus 103 is configured to avoid such regions; alternatively, where such avoidance is not possible, the apparatus 103 is configured to navigate to a region where weightings are relatively high to confirm a present position reading of the apparatus 103, as described above.

In yet further implementations, the memory 322 is configured with data which defines objects (e.g. as object data) that may be deployed in the environment, for example given types of displays, pallets and the like. In these implementations, when such an object is encountered by the apparatus 103 in the localization mode, the depth data from the depth-sensing device 230 can indicate that the environment has changed while the image data from the image device 228 indicates that the ceiling has not changed. In some of these implementations, the depth data from the depth-sensing device 230 is compared to the object data stored in the memory 322 and when a match, is found (e.g. within an error boundary) the map data is updated with one or more of the depth data and the object data to indicate the position of the object in the environment.

In yet further implementations, the map data generated based on data acquired by the apparatus 103 is provisioned at other mobile automation apparatuses within the environment, assuming that the other mobile automation apparatuses are similar and/or the same as the apparatus 103.

Disclosed herein are devices and methods for multimodal localization and mapping for a mobile automation apparatus. For example, the apparatus navigates by imaging a ceiling and, in some embodiments, by simultaneously acquiring near-ground depth data using a depth-sending device, such as a LIDAR device. In particular, a ceiling-facing imaging device acquires images of a ceiling of an environment in which the apparatus is navigating, and features are extracted from the images (e.g. using ORB, and the like) in the environment. Features are also extracted, in some embodiments, from depth data acquired by the depth-sensing device including, but not limited to, three-dimensional near-ground features. Furthermore, incremental motion of the apparatus is tracked using a proprioceptive sensor, such as a wheel odometer and the like. The position of the apparatus is hence saved with the features to produce a "map" of the environment. When a physical position is revisited, a "loop closure" is recognized, and the incremental motion+loop closures can be simultaneously optimized to produce a best estimate of a trajectory to the physical position being revisited. Furthermore, after mapping occurs, pathological regions for each of the image device and the depth sensing device are determined, and weightings are placed on each to avoid highly pathological regions and/or identify non-pathological regions used to "recalibrate" localization.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A mobile automation apparatus for navigating an environment having a ceiling comprising:
   a movement module for moving the mobile automation apparatus in the environment;
   an image device configured to acquire images in a ceiling-facing direction from the mobile automation apparatus;
   a sensor configured to monitor internal signals of the mobile automation apparatus in response to movement of the mobile automation apparatus; and
   a controller configured to:
   (a) in a mapping mode, interface with a remote control to manually navigate the mobile automation apparatus and generate map data by associating the images received from the image device with sensor data received from the sensor in response to the movement of the mobile automation apparatus, and (b) in a localization mode, autonomously navigate the mobile automation apparatus based on the map data generated in the mapping mode.

2. The mobile automation apparatus of claim 1, wherein the controller is further configured to one or more of; store, to a memory, the images with associated sensor data; and transmit, using a communication interface, the images with associated sensor data to a mapping device.

3. The mobile automation apparatus of claim 1, wherein the image device comprises one or more of a monocular camera, a stereo camera, a color camera, a monochrome camera, a depth camera, a structured light camera, a time-of-flight camera, and a LIDAR device.

4. The mobile automation apparatus of claim 1, wherein the sensor data acquired by the sensor is indicative of a distance traveled by the mobile automation apparatus as the movement module moves the mobile automation apparatus through the environment.

5. The mobile automation apparatus of claim 1, wherein the sensor data is further indicative of changes in direction of the mobile automation apparatus as the movement module moves the mobile automation apparatus through the environment.

6. The mobile automation apparatus of claim 1, wherein the sensor comprises one or more of an odometry device, a wheel odometry device, an accelerometer, a gyroscope and an inertial measurement unit.

7. The mobile automation apparatus of claim 1, wherein the sensor data and the images are one more or more of: time-stamped; acquired periodically; and acquired as a function of time.

8. The mobile automation apparatus of claim 1, further comprising a depth-sensing device configured to acquire depth data in one or more directions from the mobile automation apparatus, the controller further configured to: associate depth data received from the depth-sensing device with the images and the sensor data.

9. The mobile automation apparatus of claim 8, wherein the controller is further configured to one or more of: store, to a memory, the images with associated data and associated depth data; and transmit, using a communication interface, the images with the associated sensor data and the associated depth data.

10. The mobile automation apparatus of claim 8, wherein the depth-sensing device comprises a LIDAR device.

11. The mobile automation apparatus of claim 1, wherein the controller is further configured to one or more of navigate the environment and determine an adjusted position in the environment by comparing further features extracted from further images acquired by the image device with extracted features from the images, that are associated with positions in the environment.

12. A method in a mobile automation apparatus, the method comprising:
acquiring images in a ceiling facing direction from the mobile automation apparatus;
acquiring sensor data from a sensor configured to monitor movement of the mobile automation apparatus;
in a mapping mode of the mobile automation apparatus:
interfacing with a remote control to manually navigate the mobile automation apparatus and generating map data by associating the images with sensor data received from the sensor in response to the movement of the mobile automation apparatus, and
in a localization mode of the mobile automation apparatus: autonomously navigating the mobile automation apparatus based on the map data generated in the mapping mode.

13. The method of claim 12, further comprising one or more of; storing, to a memory, the images with associated sensor data; and transmitting, using a communication interface, the images with associated sensor data to a mapping device.

14. A device comprising:
a communication interface; a memory; and a mapping controller configured to:
receive, from one or more of the memory and the communication interface, images with associated sensor data, the images representing a ceiling of an environment acquired by a ceiling-facing imaging device at a mobile automation apparatus and the associated sensor data indicative of movement of the mobile automation apparatus through the environment;
extract features from the images;
determine, from the associated sensor data, a respective position of a mobile automation apparatus in the environment where each of the images was acquired; and,
store, in the memory, extracted features from the images with associated positions.

15. The device of claim 14, wherein the mapping controller is further configured to: receive, from one or more of the memory and the communication interface, the images with the associated sensor data and associated depth data indicative of objects located in one or more directions from the mobile automation apparatus; and store, in the memory, the extracted features from the images with the associated positions and further features extracted from the associated depth data.

16. The device of claim 15, wherein the associated positions are stored in association with the extracted features and the further features as map data, and the mapping controller is further configured to refine the map data based on one or more of further images, further depth data, and further sensor data received from the mobile automation apparatus.

17. A method comprising:
at a device comprising: a communication interface; a memory; and a mapping controller, receiving, from one or more of the memory and the communication interface, images with associated sensor data, the images representing a ceiling of an environment acquired by a ceiling-facing imaging device at a mobile automation apparatus and the associated sensor data indicative of movement of the mobile automation apparatus through the environment;
extracting, using the mapping controller, features from the images;
determining, using the mapping controller, from the associated sensor data, a respective position of a mobile automation apparatus in the environment where each of the images was acquired; and,
storing, using the mapping controller, in the memory, extracted features from the images with associated positions.

18. The method of claim 17, further comprising: receiving, from one or more of the memory and the communication interface, the images with the associated sensor data and associated depth data indicative of objects located in one or more directions from the mobile automation apparatus; and storing, in the memory, the extracted features from the images with the associated positions and further features extracted from the associated depth data.

19. The method of claim 18, wherein the associated positions are stored in association with the extracted features and the further features as map data, and method further comprises refining the map data based on one or more of further images, further depth data, and further sensor data received from the mobile automation apparatus.

* * * * *